(12) United States Patent
Hakala et al.

(10) Patent No.: US 12,423,438 B2
(45) Date of Patent: Sep. 23, 2025

(54) SECURITY AUTOMATION SYSTEM

(71) Applicant: Telefonaktiebolaget LM Ericsson (publ), Stockholm (SE)

(72) Inventors: Harri Hakala, Turku (FI); Anu Puhakainen, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 367 days.

(21) Appl. No.: 17/904,079

(22) PCT Filed: Feb. 4, 2021

(86) PCT No.: PCT/EP2021/052592
§ 371 (c)(1),
(2) Date: Aug. 11, 2022

(87) PCT Pub. No.: WO2021/160499
PCT Pub. Date: Aug. 19, 2021

(65) Prior Publication Data
US 2023/0071264 A1    Mar. 9, 2023

Related U.S. Application Data

(60) Provisional application No. 62/975,889, filed on Feb. 13, 2020.

(51) Int. Cl.
*G06F 21/57* (2013.01)
*G06F 21/56* (2013.01)
*H04L 9/40* (2022.01)

(52) U.S. Cl.
CPC .......... *G06F 21/577* (2013.01); *G06F 21/566* (2013.01); *H04L 63/20* (2013.01); *G06F 2221/034* (2013.01)

(58) Field of Classification Search
CPC .. G06F 21/577; G06F 21/566; G06F 2221/03; H04L 63/20
See application file for complete search history.

(56) References Cited

U.S. PATENT DOCUMENTS

| | | | |
|---|---|---|---|
| 8,966,639 B1 * | 2/2015 | Roytman | H04L 63/1433 726/25 |
| 9,401,926 B1 * | 7/2016 | Dubow | H04L 63/1433 |

(Continued)

FOREIGN PATENT DOCUMENTS

| | | |
|---|---|---|
| CN | 109962891 A | 7/2019 |
| EP | 3 528 462 A1 | 8/2019 |

(Continued)

OTHER PUBLICATIONS

International Search Report and Written Opinion with Transmittal dated Apr. 8, 2021 in International Application No. PCT/EP2021/052592 (13 pages).

(Continued)

*Primary Examiner* — James R Turchen
(74) *Attorney, Agent, or Firm* — Rothwell, Figg, Ernst & Manbeck, P.C.

(57) ABSTRACT

A Security automation system (100; 400; 500) configured for security management of an Information Technology (IT) system (200), the security automation system using machine learning (ML). The system comprises a Threat engine (110), a Risk engine (120), a Policy engine (130) and a Security Adaptation engine (140). The Threat engine (110) comprises a threat catalog and detection rules for identifying threat events, wherein the detection rules are automatically adjusted and modified based on information collected from the managed IT system.

13 Claims, 17 Drawing Sheets

(56) References Cited

U.S. PATENT DOCUMENTS

| | | | |
|---|---|---|---|
| 10,021,138 B2* | 7/2018 | Gill | H04L 63/1416 |
| 10,691,796 B1* | 6/2020 | Stolte | G06Q 10/0635 |
| 10,873,595 B1* | 12/2020 | Oliphant | G06F 21/50 |
| 2013/0191919 A1* | 7/2013 | Basavapatna | H04L 63/20 |
| | | | 726/25 |
| 2013/0347116 A1* | 12/2013 | Flores | H04L 63/1433 |
| | | | 726/25 |
| 2015/0222656 A1* | 8/2015 | Haugsnes | H04L 63/104 |
| | | | 726/23 |
| 2015/0373043 A1* | 12/2015 | Wang | G06F 21/6254 |
| | | | 706/12 |
| 2017/0346846 A1* | 11/2017 | Findlay | H04L 63/1433 |
| 2018/0027006 A1* | 1/2018 | Zimmermann | H04L 63/0227 |
| | | | 726/11 |
| 2018/0124072 A1* | 5/2018 | Hamdi | G06F 21/577 |
| 2018/0295154 A1* | 10/2018 | Crabtree | H04L 63/1433 |
| 2019/0098037 A1* | 3/2019 | Shenoy, Jr. | H04L 63/1441 |
| 2019/0207968 A1* | 7/2019 | Heckman | H04L 63/1433 |
| 2019/0236661 A1* | 8/2019 | Hogg | G06F 16/9537 |
| 2019/0319945 A1* | 10/2019 | Levy | H04L 63/205 |
| 2020/0167705 A1* | 5/2020 | Risoldi | G06F 21/554 |
| 2020/0412758 A1* | 12/2020 | Trivellato | G06F 21/577 |
| 2021/0019423 A1* | 1/2021 | DuBois | G06F 21/552 |

FOREIGN PATENT DOCUMENTS

| | | |
|---|---|---|
| WO | 2019/211592 A1 | 11/2019 |
| WO | 2021/028060 A1 | 2/2021 |

OTHER PUBLICATIONS

International Preliminary Report on Patentability dated Jun. 14, 2022 in International Application No. PCT/EP2021/052592 (13 pages).

Written Opinion of the International Preliminary Examining Authority dated Feb. 9, 2022 in International Application No. PCT/EP2021/052592 (6 pages).

* cited by examiner

SECURITY AUTOMATION SYSTEM

CROSS REFERENCE TO RELATED APPLICATIONS

This application is a 35 U.S.C. § 371 National Stage of International Patent Application No. PCT/EP2021/052592, filed Feb. 4, 2021, which claims priority to U.S. provisional application No. 62/975,889 filed Feb. 13, 2020.

TECHNICAL FIELD

The proposed technology generally relates to Information Security (IS) and Information Technology (IT), and specifically concerns a security automation system configured for security management of an Information Technology system, and a network entity of a communication system or network comprising such a security automation system, a method for security management of an Information Technology system as well as a corresponding computer program and computer-program product.

BACKGROUND

The field of Information Security (IS) and Information Technology (IT) concern various aspects such as security policies, technical security, operational security, security risk management, risk evaluation, risk treatment handling, risk mitigation, risk monitoring, threat monitoring, threat detection and so forth.

Current security management related solutions are targeted for IS/IT environments in enterprise networks, and are normally specific to one particular purpose such as:

Security Incident and Event Management (SIEM) systems collect security events and logs from different servers, mainly from IT security tools and performs filtering and/or alerting procedures based on those and raise alarms on suspicious events.

Configuration of servers with scripts and tools is meant for hardening the servers, this is usually performed one by one per server and is often a manual procedure.

Verifying existing vulnerabilities with scanners is used to check servers one by one if there are existing known vulnerabilities in the servers. Vulnerability management reports are analyzed usually manually by a security expert.

Workflow engines are targeted to automate simple incident response flows.

Governance, Risk, Compliance (GRC) systems are targeted for overall enterprise security risk management and are limited to snapshot views hence being to large extent non-real time solutions.

GRC systems do not have connection to operational networks and dynamically managing operational risks.

Risk management is usually performed as desktop/paper exercise at specific time slots.

Among other issues, the following issues can be identified with the current technical solutions:

1. They are not inter-connected, and they are usually separate systems or solutions.
2. There is no end to end flow from detected security events and logs through security risk monitoring and deeper event analysis including history information to final risk evaluation and mitigation decisions where security policies are adjusted.
3. They require many manual steps to be performed by a security analyst to map the security event information, security configuration information, risk information and historical data in order to be able to decide what protective actions need to be performed.
4. Manual steps are time consuming and the amount of data makes it ineffective and error prone to try to find links and connections between different data elements.
5. They are not combining and correlating information automatically on-line from different systems or solutions and turning them into security risks that shall be managed, that is, they don't support risk-based approach to threat and vulnerability management by prioritizing threats and vulnerabilities that matter most.
6. Gathering, correlating and analyzing threat information from multiple internal & external sources to quickly define new technical and operational security policies and controls.
7. They don't provide evidence-based mechanism to follow up whether operational and technical security policies are adhered.
8. They are not considering any identified security risks related to selection of technical and operational controls.
9. There is no direct linking from evidence-based mechanism to adjust operational security processes and controls.
10. There is no effective end to end risk-driven security management automation in technical or operational level.
11. There is no on-line risk insight available that is regularly updated by the different information flows.
12. Multiple individual systems are operated based on pre-defined rules or playbooks that are specific to each system.
13. Current workflow systems are focusing on incident response flows, not combining information from different sources, mapping them to the managed context and orchestrating between security risk management, security configurations and policies and security threat pattern and auditing.
14. They don't have proper analytics loop to continuously execute deep event analytics to detect similar malicious behavior during the specified time period.

There is thus a general need for improvements related to security management of Information Technology systems in various technological applications.

SUMMARY

It is a general object to provide improved security management of an Information Technology system.

It is a specific object to provide a security automation system configured for security management of an Information Technology system.

It is also an object to provide a network entity, related to a communication system or network, comprising such a security automation system.

Another object is to provide a method for security management of an Information Technology system.

Yet another object is to provide a computer program for performing, when executed, security management of an Information Technology system.

These and other objects are met by embodiments of the proposed technology.

According to a first aspect, there is provided a security automation system configured for security management of an Information Technology (IT) system. The security automation system uses machine learning (ML) and comprises a Threat engine, a Risk engine, a Policy engine and a Security Adaptation engine. The Threat engine comprises a threat catalog and detection rules for identifying threat events, wherein the detection rules are automatically adjusted and modified based on information collected from the managed IT system.

According to a second aspect, there is provided such a Security automation system, comprising processing circuitry and memory. The memory comprises instructions executable by the processing circuitry, whereby the security automation system is operative to perform security management of the IT system.

According to a third aspect, there is provided a network entity of a communication system or network, comprising such a security automation system.

According to a fourth aspect, there is provided a method for security management of an Information Technology system having a number of interacting system components.

According to a fifth aspect, there is provided a computer program for performing, when executed, security management of an Information Technology system. The computer program comprises instructions, which when executed by at least one processor, cause the at least one processor to perform such a method for security management.

The advantages with the proposed technology involve to effectively provide and/or support improved security management of an Information Technology system.

In a sense, the proposed technology may, according to an exemplary embodiment, be regarded as a risk-based or risk-driven adaptive security automation system and method for an Information Technology (IT) system. For example, the proposed technology may connect risk management, security policy management and/or enforcement, vulnerability information and threat pattern auditing and analysis into one or more unified action flows. The risk-based security automation, although risk-based, may be triggered or initiated based on threat analysis/monitoring, security policy adaptation and/or new security vulnerabilities, which in turn may affect risk analysis and/or evaluation. By way of example, detected security events may be checked in relation to technical and/or operational security policies and risk database and routed for risk evaluation. Based on the risk treatment decision, the proposed technology may provide fully automated or security-analyst assisted action flows to manage the observed security risk or to further monitor the observed security risk for a given context.

By way of example, the security automation procedure may be designed to be able to identify, analyze and/or monitor security threats to provide useful input to risk evaluation and/or security policy management. For example, threat information may then be used for security policy adaptation and/or for triggering one or more policy-based security control actions. By way of example, threat information may be used for risk evaluation and/or further risk monitoring and/or further threat analysis, and/or for triggering one or more policy-based security control actions, in or more unified action flows between the interacting components.

Even though security control actions may be regarded as executed or effectuated by a security adaptation and/or configuration component in the overall security automation procedure, the security control actions are normally triggered or otherwise initiated based on risk-based security policies and/or controls.

Optionally, the proposed technology may use machine learning technologies to combine information automatically from threat pattern analysis, risk information, vulnerability information, operational and technical security policies, historical data and other data with actual network asset inventory. Advantageously, it may provide end-to-end visibility of the overall risk level and risk status of the whole IT system and may direct actions towards areas with highest risk levels.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
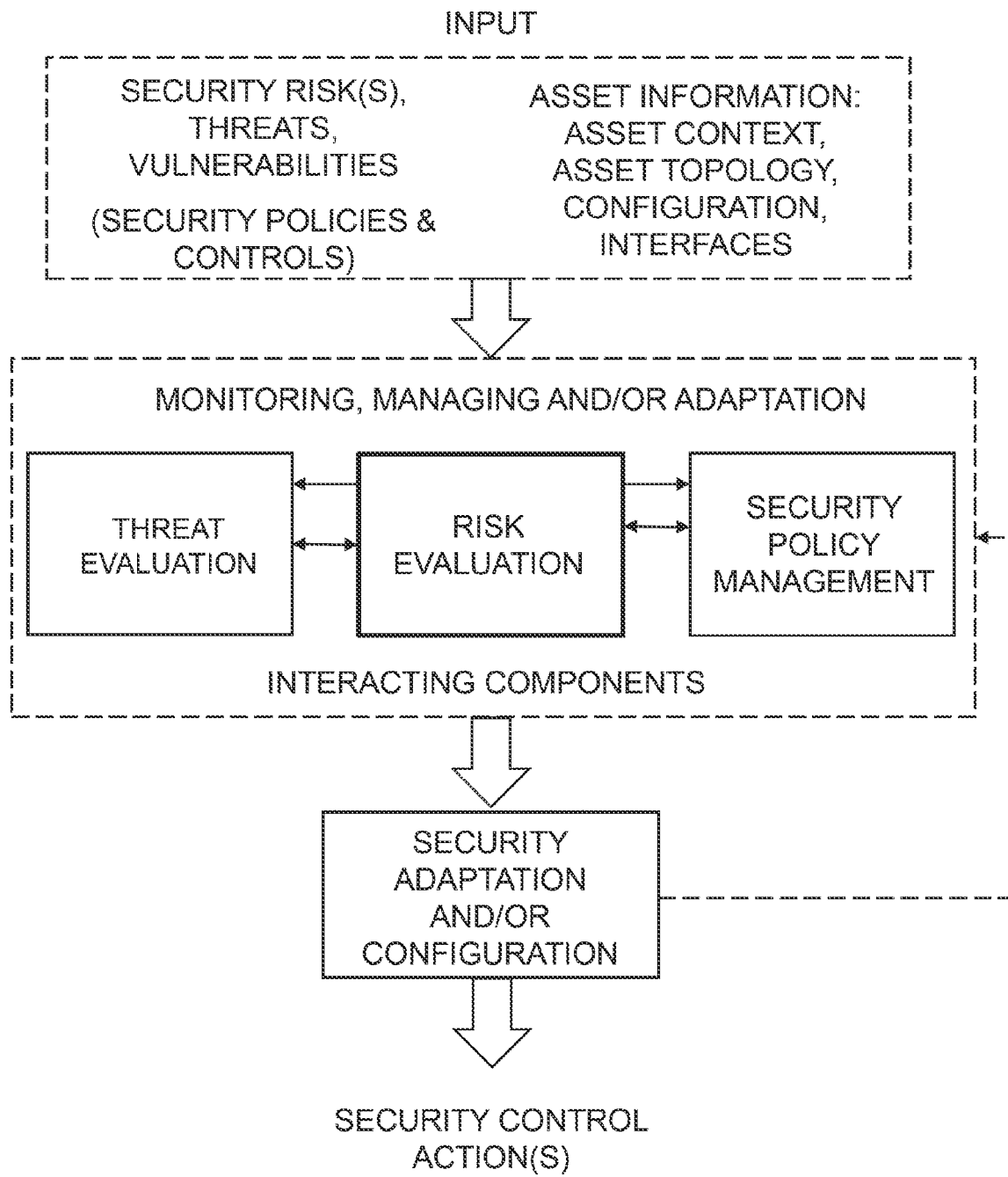
FIG. 1 is a schematic diagram illustrating an example of an improved security automation process or procedure according to an embodiment.

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the non-limiting term "threat" may for example refer to any circumstance, incident or event with the potential to adversely impact a technological system and/or the operation thereof and/or an asset of such a system. In other words, a threat may be seen as a possible danger that might exploit a vulnerability to breach security and therefore cause possible harm. Expressed differently, this may relate to an event or situation that has the potential for causing undesirable consequences or impact.

As used herein, the non-limiting term "risk" may for example relate to a situation in which it is possible but not certain that some unwanted or undesirable event will occur. The term may often be used synonymously with the probability of the unwanted event to occur. In some cases, risk may be regarded as the product of threat impact and probability of threat occurrence, where threat impact is defined as the value of losses due to a threat being realized.

As used herein, the non-limiting term "risk level" may for example refer to a calculated value of risk. For example, the calculated value of the risk may be compared against risk acceptance criteria, to make decisions about how to treat the risk, e.g. whether to manage, monitor or accept the identified risk or risks.

As used herein, the non-limiting term "least privilege" may for example refer to the concept and practice of restricting access rights for users, accounts, and computing processes to only those resources absolutely required to perform routine, legitimate activities.

As used herein, the non-limiting term "segregation of duties" may for example refer to the concept of having more than one person required to complete a task. In business the separation by sharing of more than one individual in one single task is an internal control intended to prevent fraud and error.

As used herein, the non-limiting term "security event" may for example refer to any event and/or incident and/or circumstance that may affect the security of a considered system and/or procedure, and may involve and/or relate to security threats, risks and/or vulnerabilities. For example, information about security events may communicated in log files, as alarms and/or notification, and may be received, e.g. from the managed servers and/or other network components.

As used herein, the non-limiting term "detection rule" may for example refer to pre-defined or machine-learning based rules for identifying abnormal behavior and/or policy violations.

As used herein, the non-limiting term "Information Technology system" may refer to any technological system for generating, processing, storing and/or transferring information.

As used herein, the non-limiting term "server" may generally refer to any technical entity, component, device, system and/or or node located in connection with a network environment such as an enterprise network As used herein, the non-limiting term "network entity" may generally refer to any technical entity, component, device, system and/or or node located in connection with a network environment such as a wired and/or wireless communication network, including Internet components, servers and/or network nodes of wireless communication systems.

As used herein, the non-limiting term "network node" may refer to any node or device located in connection with a communication network, including but not limited to devices in access networks, core networks and similar network structures. The term network node may also encompass cloud-based network devices.

As used herein, the non-limiting term "engine" may refer to any functional module or unit for executing one or more process steps and/or performing one or more actions such as computations, monitoring, analysis, evaluation, decisions, execution of security control workflows and so forth, and may be implemented in hardware or software executing on processing hardware such as one or more processors. Such a functional module or unit, when operating as an engine, may also have communication interfaces for internal and/or external communication for input/output and/or receiving/sending of relevant information.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As mentioned in the background, there are a number of issues and/or problems with the current technical solutions for security management of Information Technology systems.

The proposed technology provides an improved solution, as exemplified below with reference to exemplary embodiments.

FIG. 1 is a schematic diagram illustrating an example of an improved security automation process or procedure according to an embodiment. The security automation process is typically related to an Information Technology (IT) system, which has a number of interacting system components, each system component being associated with one or more operational assets for the operation of the system component. The operational assets may be organized in one or more security domains according to a system topology.

The proposed technology may implement interconnection and mapping of information from different sources.

Based on various bases, or sets, of information, such as information on security risks, threats and/or vulnerabilities, and/or asset information including asset context, asset topology, configuration and/or interfaces, threat and/or risk evaluation and/or monitoring may be executed. Based on such threat and/or risk evaluation and/or monitoring, proper security adaptation and/or configuration may be determined and/or updated to decide on and/or provide one or more security control actions, in cooperation with a security policy component.

For example, the security automation procedure and/or system may therefore be configured to obtain:

security information representative of security risks, system vulnerabilities and/or security threats related to at least a subset of the operational assets of the system components, asset information representative of the system topology, asset configuration and/or dependency between assets, and/or security configuration information representative of asset and/or domain security configuration.

By way of example, the security configuration information representative of asset and/or domain security configuration may include information representative of asset security configuration and/or information representative of domain security configuration.

Optionally, information about security policies and/or controls may also be considered.

An example of an overall security automation procedure is based on functions for monitoring, managing and/or adaptation involving three main interacting components: threat evaluation, risk evaluation and security policy management.

The proposed technology may for example create automated and dynamic risk-based or risk-driven action flows, keeping the risk level acceptable by risk treatment actions and keeping the context compliant to given operational and technical security policies.

By way of example, the security automation procedure may be designed to be able to identify, analyze and/or monitor security threats to provide useful input to risk evaluation and/or security policy management. For example, threat information may then be used for security policy adaptation and/or for triggering one or more policy-based security control actions. As an example, threat information may be used for risk evaluation and/or further risk monitoring and/or further threat analysis, and/or for triggering one or more policy-based security control actions, in or more unified actions flows between the interacting components.

In this way, it is possible to effectively provide and/or support improved security management of an Information Technology system.

Even though security control actions may be regarded as executed or effectuated by a security adaptation and/or configuration component in the overall security automation procedure, the security control actions are normally triggered or otherwise initiated based on risk-based security policies and/or controls.

Further, information about the determined and/or updated security configuration may optionally be used as feedback to provide useful information for the evaluation and/or monitoring of security threats, risks and/or other security vulnerabilities.

Figure 2:
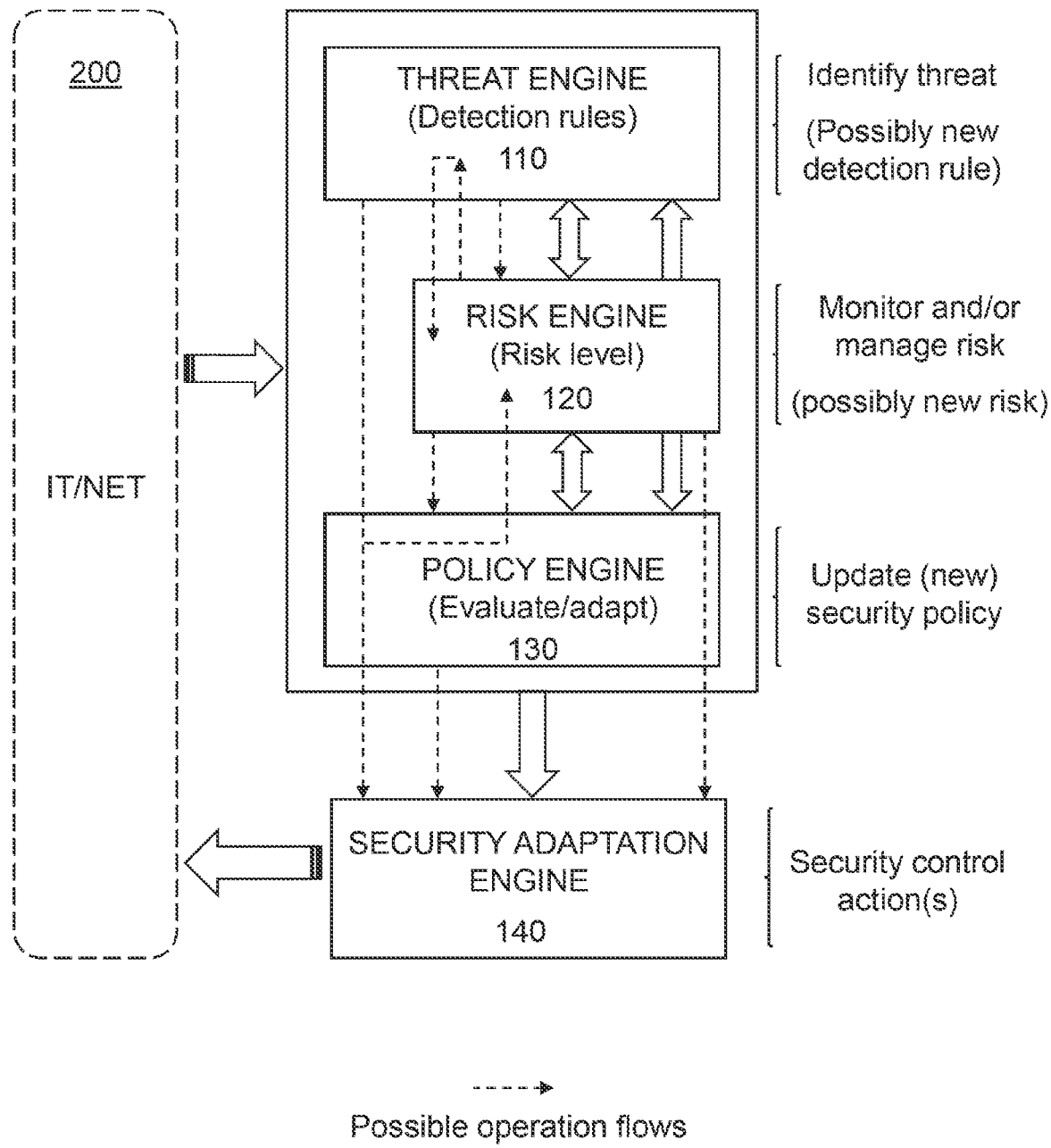
FIG. 2 is a schematic diagram illustrating an example of a security automation system according to an embodiment.

FIG. 2 is a schematic diagram illustrating an example of a security automation system according to an embodiment.

The security automation system 100 represented in FIG. 2 is configured for security management of an associated Information Technology (IT) system 200, which may for example be part of a communication system or network (NET).

In this particular example, the security automation system 100 comprises a threat engine 110, a risk engine 120, a policy engine 130, and a security adaptation engine 140.

By way of example, the security automation system 100 may implement interconnection and mapping of information from different sources and create automated security control action flows, keeping the risk level acceptable, and the context compliant and trustworthy according to given policies.

By way of example, the security automation system 100 may be configured to determine one or more security control actions for a fully automated or security-analyst-assisted workflow to mitigate security risks and/or security threats.

In a sense, the security adaptation engine 140 may be seen as an orchestration layer for effectively interworking with the other system components. By way of example, the security adaptation engine may be configured to communicate, via workflows to at least a subset of security automation system sub-components, threat and/or risk information and events at least partly based on the threat and/or risk assessment performed by the threat engine 110 and/or risk engine 120, possibly in cooperation with the policy engine 130.

The security adaptation engine 140 may be configured to determine and/or effectuate one or more security control actions related to at least a subset of the operational assets and/or domains, and/or perform security configuration according to the determined security control action(s).

The configuration and operation of such a security automation system or apparatus will be described in greater detail later on.

For example, based on risk evaluation and treatment decisions reflecting applicable security policies, the security automation system may provide fully automated or security-analyst-assisted workflows to mitigate security threats and/or risks for a given context. The security automation system may provide end-to-end visibility to the threat and risk status of the system and make automated qualifications in near real-time, e.g. with the aid of machine learning technologies to adjust security controls, insert security functions and/or provide information to external systems.

For example, the threat engine 110 may be configured to identify a threat based on a set detection rules and possibly provide a new detection rule, and provide relevant input to the risk engine 120 and/or policy engine 130. It may also perform a further threat analysis, e.g. as triggered by the risk engine 120.

For example, the risk engine 120 may be configured to monitor and/or manage one or more risks, e.g. based on risk evaluation, which may lead to further monitoring and/or analysis of risk and/or threat, or risk management based on relevant/valid security policy.

For example, the policy engine 130 may be configured to evaluate and/or adapt and/or update one or more (existing or new) security policies used for determining whether various security control actions should be invoked.

For example, the security adaptation engine 140 may be configured to execute and/or effectuate one or more security control actions affecting the considered IT system 200 being managed by the security automation system 100.

In a particular example, at the initialization phase and/or early production phases supervised machine learning may be used to map one or more input variables (e.g. vulnerabilities, threats) to one or more output variables (e.g. type of risk, policy) based on pre-defined input-output pairs (learning data).

For example, a supervised learning algorithm may analyze the training or learning data and produce an inferred function, which can be used for mapping new input-output pairs.

After the system has been monitored for some time, it may be possible to employ unsupervised machine learning to collect new input data (e.g. zero-day vulnerabilities)

without capability to link input directly to output. This approach helps detect anomalous data points that do not fit into either group. The collected data can then be later feed to supervised learning or other machine learning algorithms.

The security automation system of the proposed technology may be operated more or less autonomously in connection with an Information Technology system that needs improved security, or may be operated on top of existing SIEM and/or SOAR systems and utilize such systems for information retrieval and threat and/or risk evaluation.

Figure 3:
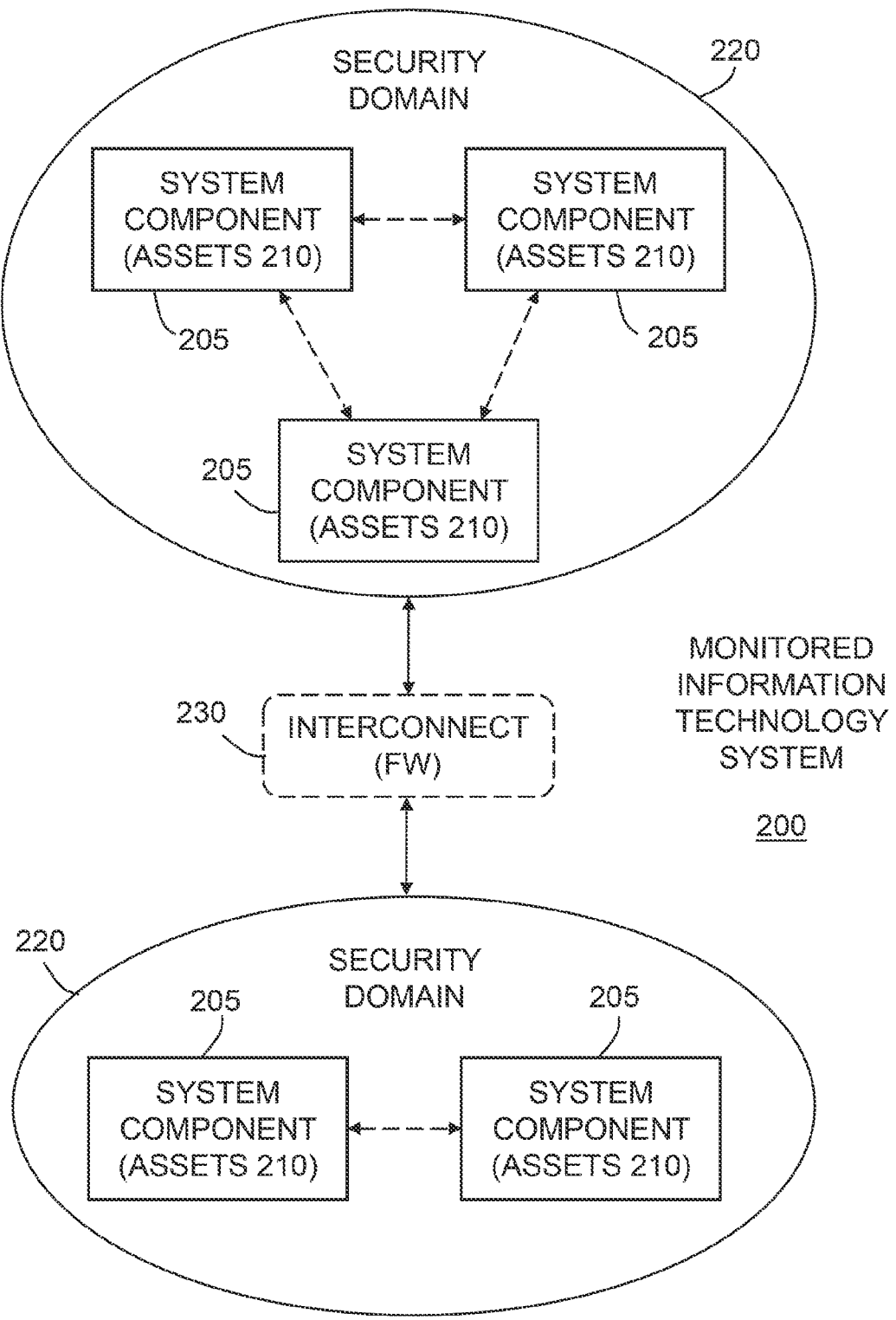
FIG. 3 is a schematic diagram illustrating an example of a monitored Information Technology system.

FIG. 3 is a schematic diagram illustrating an example of a monitored Information Technology system. As can be seen, the Information Technology system 200 has a number of interacting system components 205, each system component 205 being associated with one or more operational assets 210 for the operation of the system component. The system components 205 and the associated operational assets 210 are organized in one or more security domains 220 according to a system topology.

Different security domains 220 may be interconnected via an optional interconnect 230, such as a firewall (FW).

The operational assets 210 may use various communication interfaces and/or protocols, and appropriate security controls may be deployed for the operational asset(s) or planned for deployment.

For example, the operational assets 210 may include at least one of:
hardware and/or software components of the Information Technology system 200,
configurations, workflows, communication interfaces, and/or associated databases of the hardware and/or software components, and
organization of the assets 210 in one or more security domains 220 according to the system topology.

In a particular example, the operational assets 210 include at least one digital asset, and the one or more security control actions typically include at least one executable security control operating on the at least one digital asset and/or an associated security domain.

Figure 4:
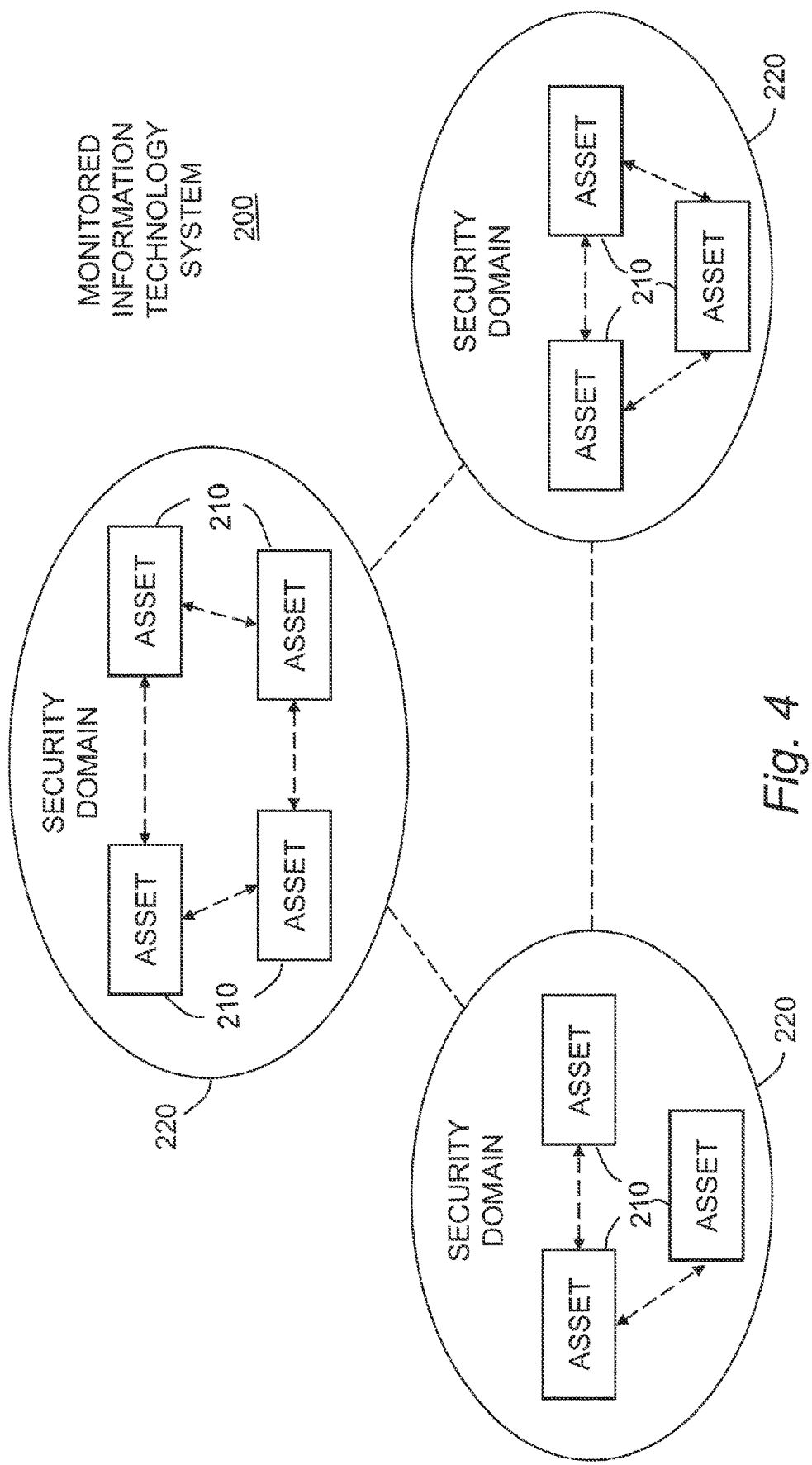
FIG. 4 is a schematic diagram illustrating another example of a monitored Information Technology system.

FIG. 4 is a schematic diagram illustrating another example of a monitored Information Technology system. In the example of FIG. 4, another asset topology is illustrated, with assets 210 being organized in different security domains that may be interconnected to one another. The assets 210 within a security domain 220 may have various interdependencies.

For example, the security automation system may be configured to determine, for each of at least a subset of the operational assets 210 and/or for each of a number security domains 220, a risk level also at least partly based on dependency between assets 210.

In a particular example, the security automation system is configured to determine, for each of at least a subset of the operational assets 210 and/or for each of a number security domains 220, a risk level also at least partly based on asset placement in the system topology, the number and nature of security risks and/or threats, communication interface(s) and/or protocol(s) used by the operational asset(s) and/or deployed security controls for the operational asset(s).

As an example, the security automation system may be configured to determine one or more security control actions based on Machine Learning (ML).

For example, the security automation system may be configured to perform ML-based risk treatment analysis on how to handle security risks when the determined risk levels exceed a given threshold and determine one or more of the security control actions related to at least a subset of the operational assets 210 and/or domains 220 based on the ML-based risk treatment analysis.

Optionally, the security automation system may be configured to detect one or more security risks, system vulnerabilities and/or security threats based on Machine Learning (ML).

In a particular example, the one or more security control actions includes updating or adding a new a security policy, adjusting a security configuration, removing an existing security function and/or inserting a new security function.

It should be understood that the Information Technology system may be any system for generating, processing, storing and/or transferring information.

In a particular, non-limiting example, the security automation system may be configured for security management of the Information Technology system 200 of a communication system or network 300.

Figure 5:
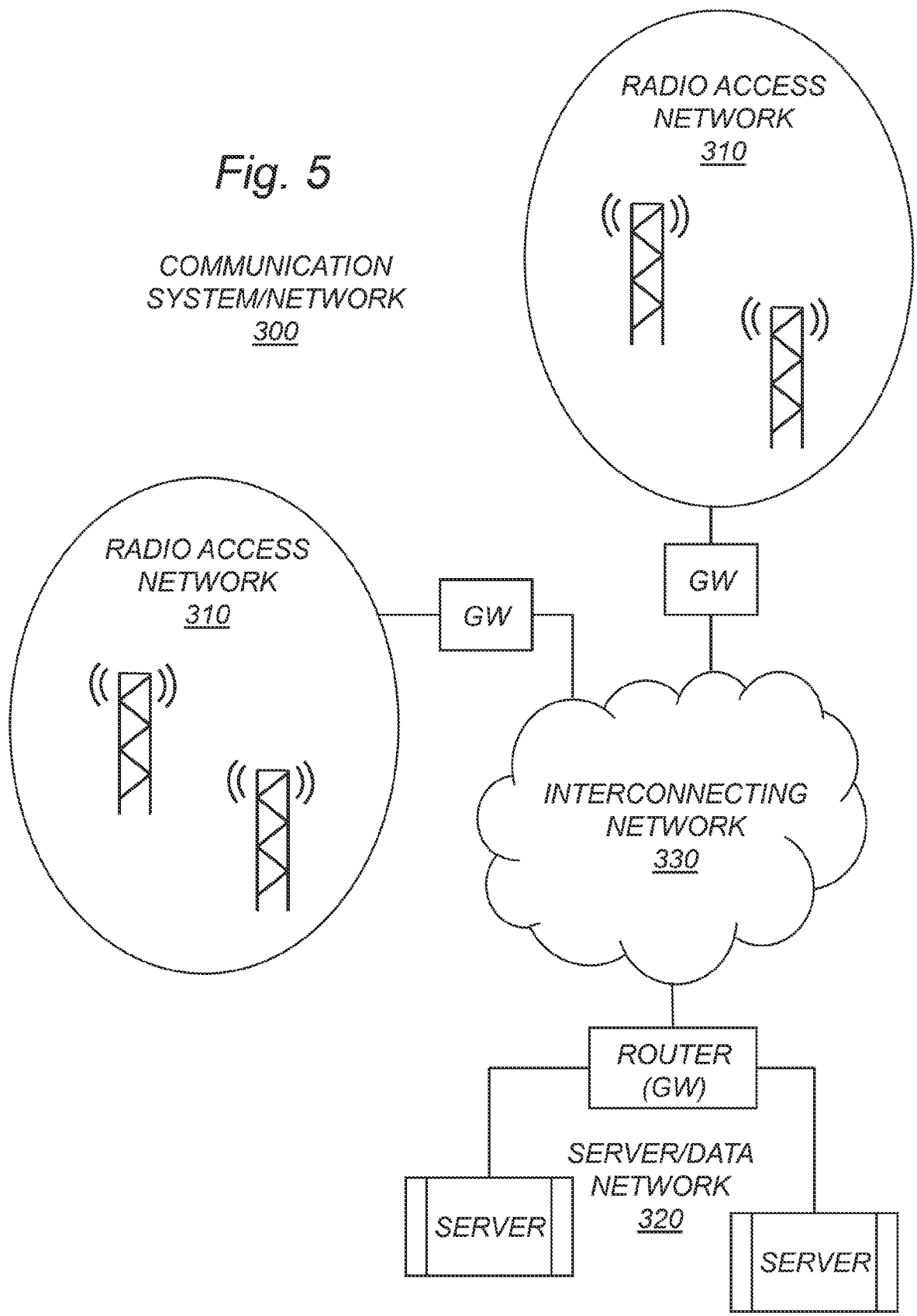
FIG. 5 is a schematic diagram illustrating an example of a communication system/network having Information Technology components.

FIG. 5 is a schematic diagram illustrating an example of a communication system/network having Information Technology components. The overall communication system/network 300 may include wireless communication systems such as radio access networks 310, wired communication systems such as server/data networks 320 as well as interconnecting networks 330, and may include system components such as radio base stations, access points, radio controllers, network management units, communication gateways, routers, servers and the like, each of which may have Information Technology components for generating, processing, storing and/or transferring information.

For example, the Information Technology system may be an integrated part of the communication system or network 300 and the interacting system components 205 of the Information Technology system 200 may involve network nodes and/or elements of the communication system or network 300.

Figure 6:
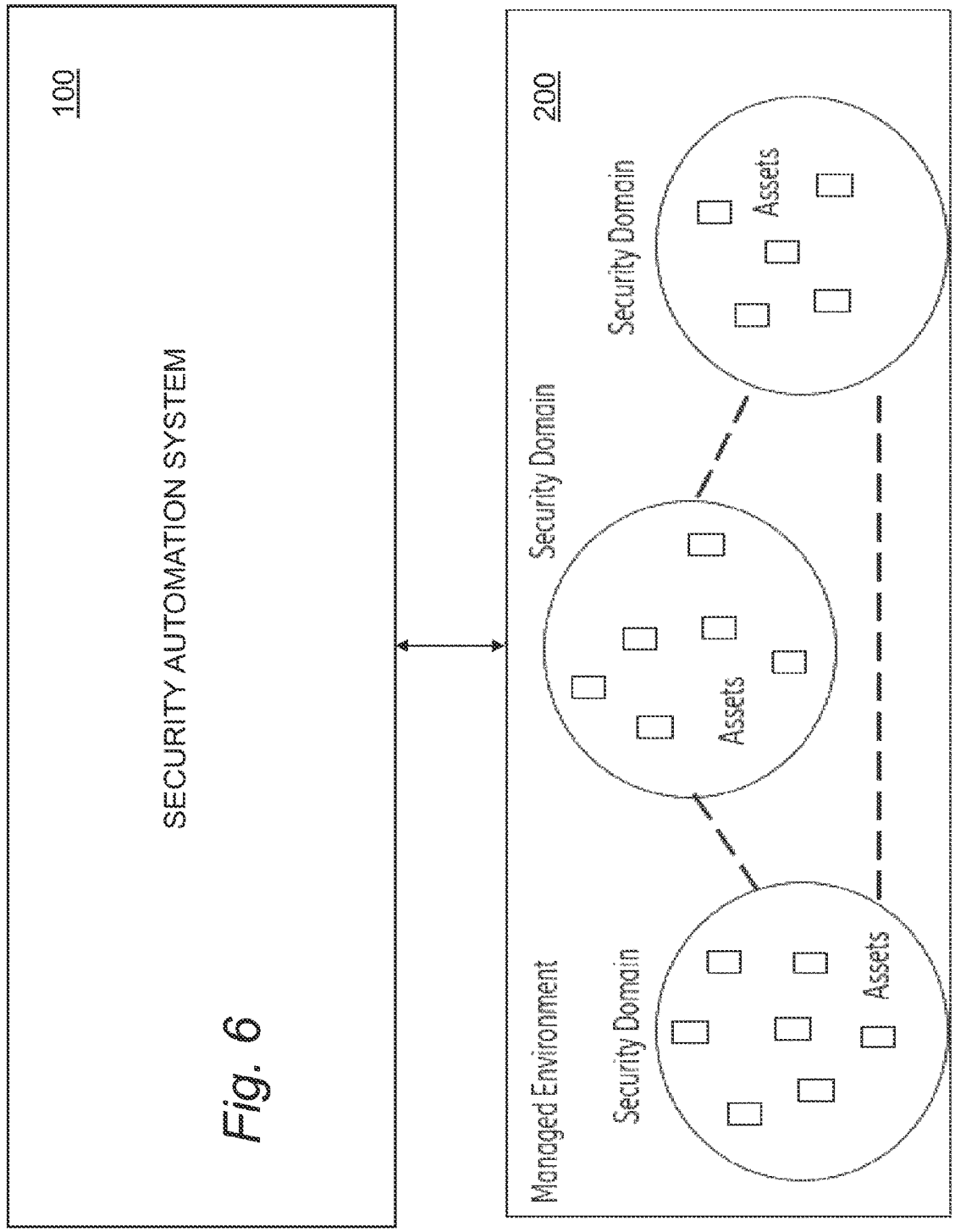
FIG. 6 is a schematic diagram illustrating an example of security automation system in connection with a managed environment.

FIG. 6 is a schematic diagram illustrating an example of security automation system 100 in connection with a managed environment 200. The managed environment 200 such as an Information Technology (IT) system comprises assets organized in security domains.

With reference once again to FIG. 2, it is clear that the security automation system 100 may include a threat engine 110, a risk engine 120, a policy engine 130, and a security adaptation engine 140 that are operatively interconnected.

Non-Limiting Examples of Possible Implementations

For a better understanding, the proposed technology will now be described with reference to one or more non-limiting examples.

The security automation system may implement interconnection and mapping of information from different sources. It may also create automated and dynamic risk-driven action flows, keeping the risk level acceptable by risk treatment actions and keeping the context compliant to the given operational and technical security policies.

Figure 7:
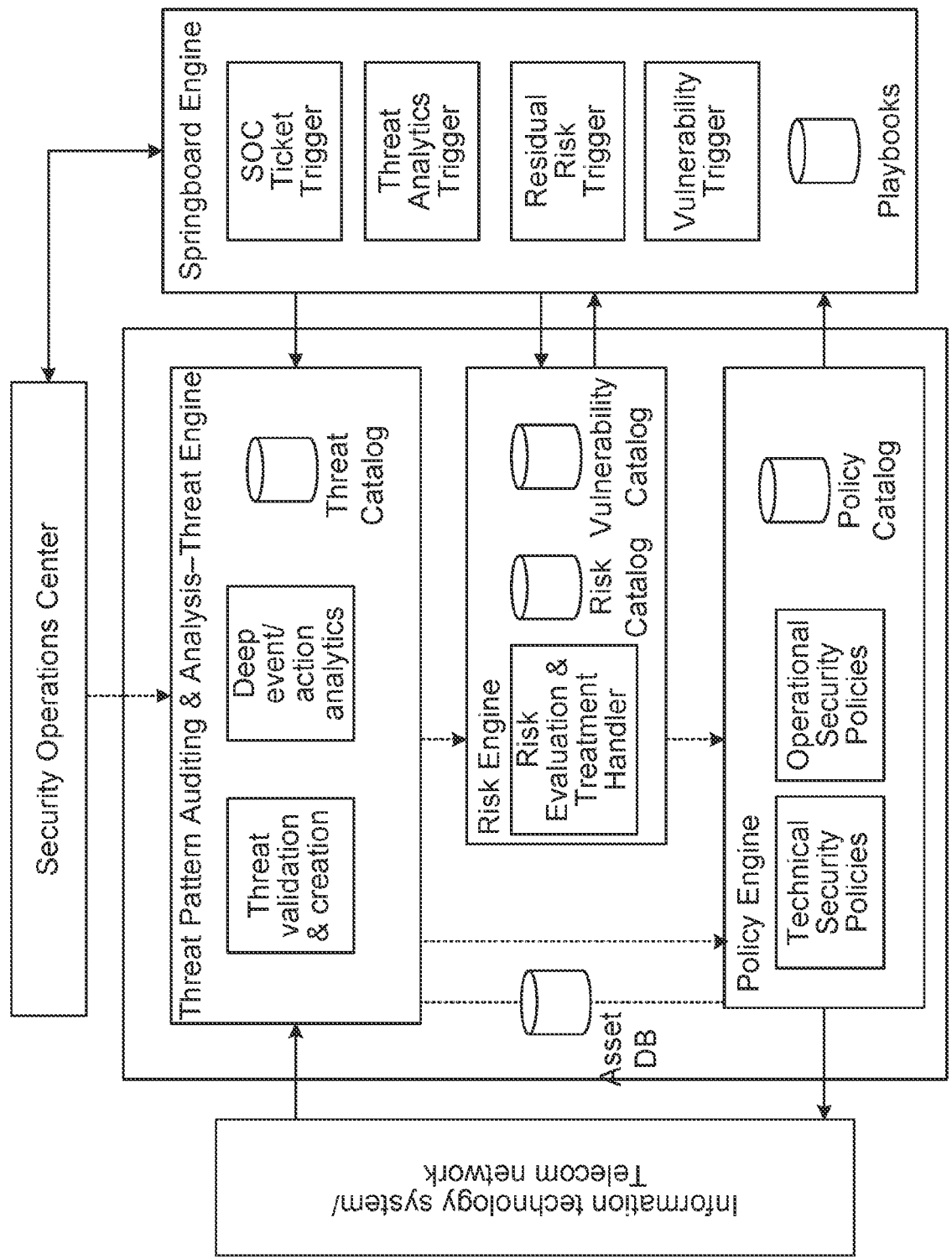
FIG. 7 is a schematic diagram illustrating an example of a security automation system according to a specific embodiment.

In the following, reference will be made to FIG. 7, which is a schematic diagram illustrating an example of an overall security automation system according to a specific embodiment, as well as the specific FIGS. 8-15.

Figure 8:
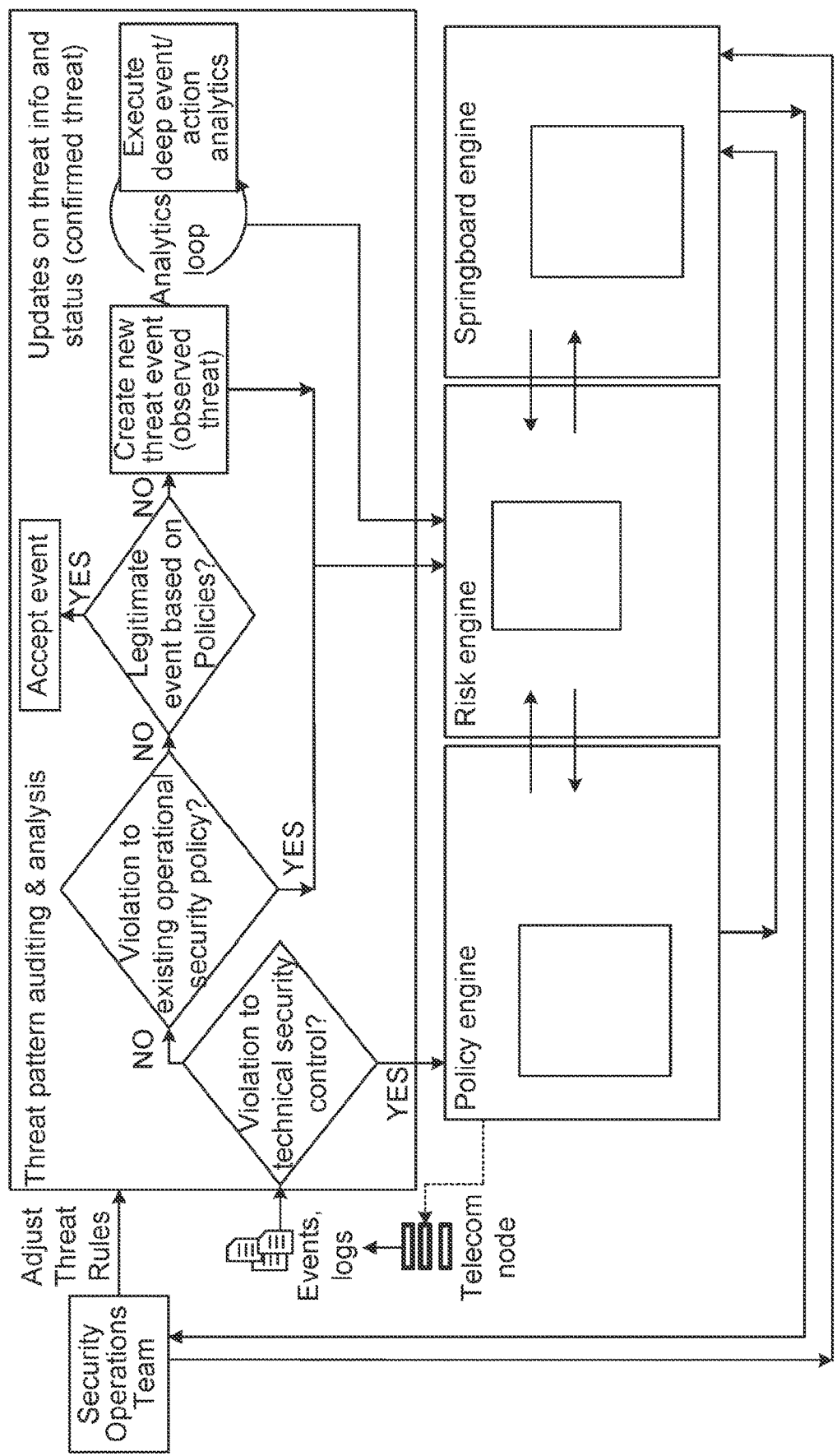
FIG. 8 is a schematic diagram illustrating an example of illustrative operations of a threat engine within an overall context according to a specific embodiment.

Components of a Risk Driven Adaptive Security Automation System:

Threat Pattern Auditing and Analysis Engine—Threat Engine:

FIG. 8 is a schematic diagram illustrating an example of illustrative operations of a threat engine within an overall context according to a specific embodiment.

Threat Pattern Auditing and Analysis Engine, also referred to as Threat Engine, collects, analyzes and monitors security events from the information technology system.

For example, the Threat Engine includes a Threat Catalog with a threat catalog and detection rules in order to monitor risk realization, behavior of technical and operational policies and interacts with asset database for information on the server types under monitoring. The pre-defined and machine-learning based detection rules are used to automatically identify signs of malicious and abnormal activities in servers. These abnormalities can be against the defined technical and operational security policies or related to already identified risks or new risks. Complex detection rules can be also defined by chaining individual detection rules. For instance, monitoring least privilege or segregation of duties type of operational policies can be achieved by having several individual detection rules for verifying that no user can use a group account to perform task with privileged entitlements on the network nodes.

When data (event, log file, alarm, notification, etc.) is received from the managed servers, Threat Pattern Auditing and Analysis may execute Threat Validation based on the received data content and its detection rules and compares the data against the defined technical and operational policies to detect possible policy violations or new threat events that may be related to existing risks or new risks.

If the detection rules detect a violation against the Technical Security policies (based on the defined Policy catalog) the Threat Pattern Auditing & Analysis may invoke the policy engine to verify the infraction of the technical security policy. If there are no violation against the technical security policies and their controls, next the verification against the operational polices are done. Machine Learning algorithms are used to train the Threat Pattern Auditing & Analytics Engine to recognize legitimate events from the malicious ones.

If there is indication of an operational policy violation, the Risk Engine may be invoked to perform further risk evaluation and actions. If there is no violation against operational security policies, the next verification is to analyze if the event is legitimate event based on policies or not. If yes, event is accepted as normal behavior. If not, then the threat event is recorded as "new observed threat" and Risk Engine is invoked to perform further risk evaluation and actions.

For example, deep event/action analysis may be invoked by Risk Engine when there is a need to execute detailed analysis of an event or series of events based on historical information and execute continuous analytics loop for new events. Deep event/action analysis is updating threat information and threat status back to Risk Engine.

Figure 9:
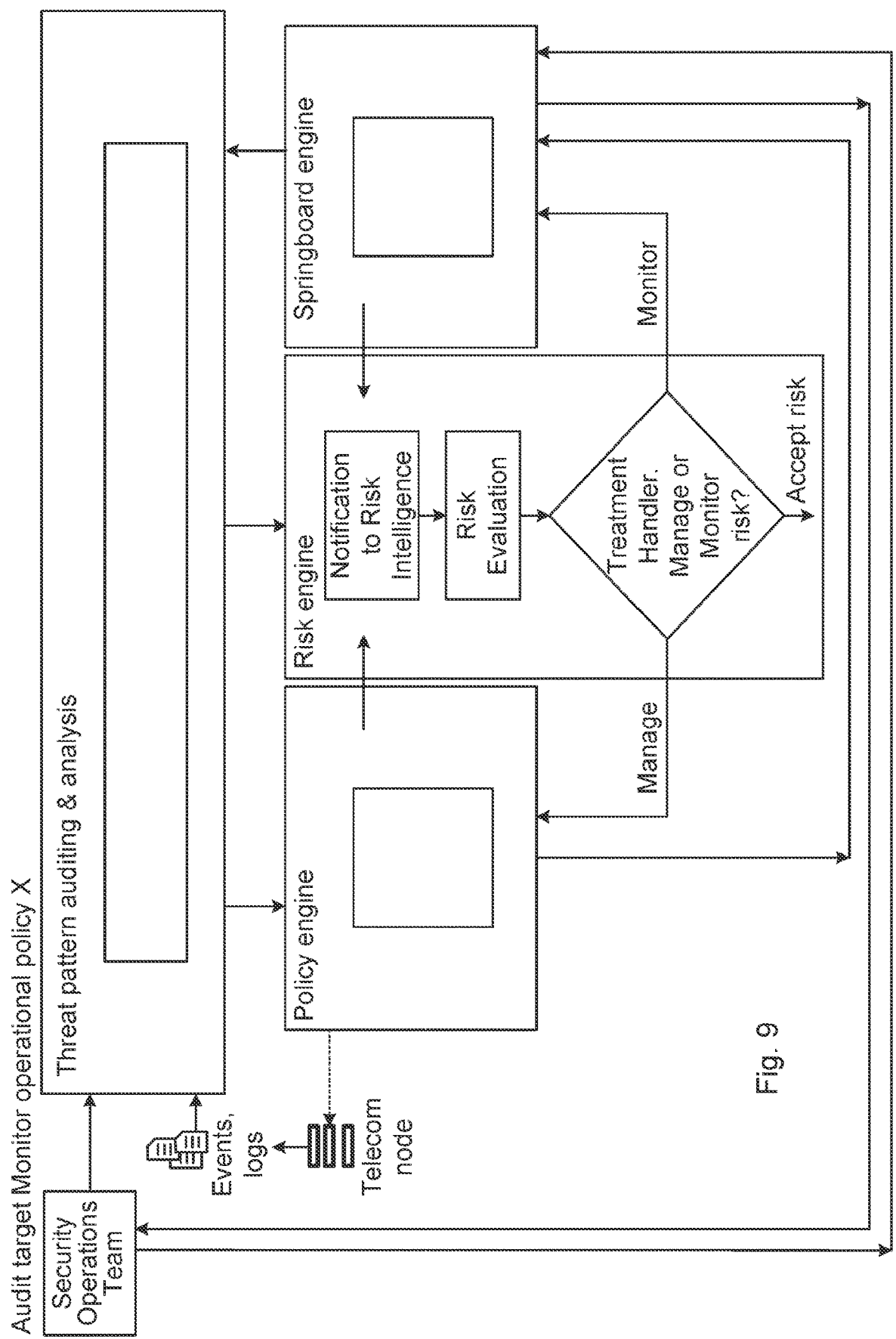
FIG. 9 is a schematic diagram illustrating an example of illustrative operations of a risk engine within an overall context according to a specific embodiment.

Risk Engine:

FIG. 9 is a schematic diagram illustrating an example of illustrative operations of a risk engine within an overall context according to a specific embodiment.

For example, the Risk engine receives risk notifications from other components, evaluates and calculates risk level for the information technology system under monitoring and carries out a risk treatment analysis on whether to manage, monitor or accept the identified risks.

For example, the Risk Engine comprises a Risk Catalog with a database or list of potential risks and identified risks relevant for the system under monitoring and it interacts with asset database for information on the server types. Risks can be related to technical and operational security policies or related to existing risk under monitoring or new risks.

For example, the Risk Engine comprises a Vulnerability Catalog with a database or list of relevant generic vulnerabilities for the information technology systems, known software vulnerabilities and indicators of compromise received from external information sources. Software vulnerabilities and indicators of compromise are mapped to generic vulnerability families with help of machine learning algorithms for the system under monitoring.

After the Risk Engine has received risk notification from another component, it may compare the risk against risk catalog and risk acceptance criteria. It performs risk calculation and estimation, e.g. based on machine learning algorithms and passes the risk rating to the Risk Treatment Handler. In risk treatment machine learning based risk treatment analysis is carried out on how to treat each unacceptable risk.

The risk treatment options relevant for Risk Engine may include risk modification (management), risk monitoring and risk acceptance. These treatment options can be executed automatically or by involving human interaction. Actions are initiated and routed via springboard engine.

For example, the Risk Treatment Handler performs the risk treatment analysis for the received risks. As a result of risk evaluation, Risk Treatment Handler may select either to manage, monitor or accept the risks. If manage is selected, then proper technical and/or operational policies and controls are selected to enhance the protection for the monitored system. It forwards the protection instructions to the Policy Engine to introduce, remove or alter dynamic or static controls automatically for the permanent or temporary protection. If risk level is raised, but not yet to be managed, it will be monitored. Monitoring is initiated by Springboard Engine towards Threat Pattern Auditing & Analysis in order to validate if it is a confirmed threat requiring risk re-evaluation and actions accordingly.

If risk is accepted, then no actions are taken, and risk evaluation result is recorded by Risk Engine for further reference and usage.

Figure 10:
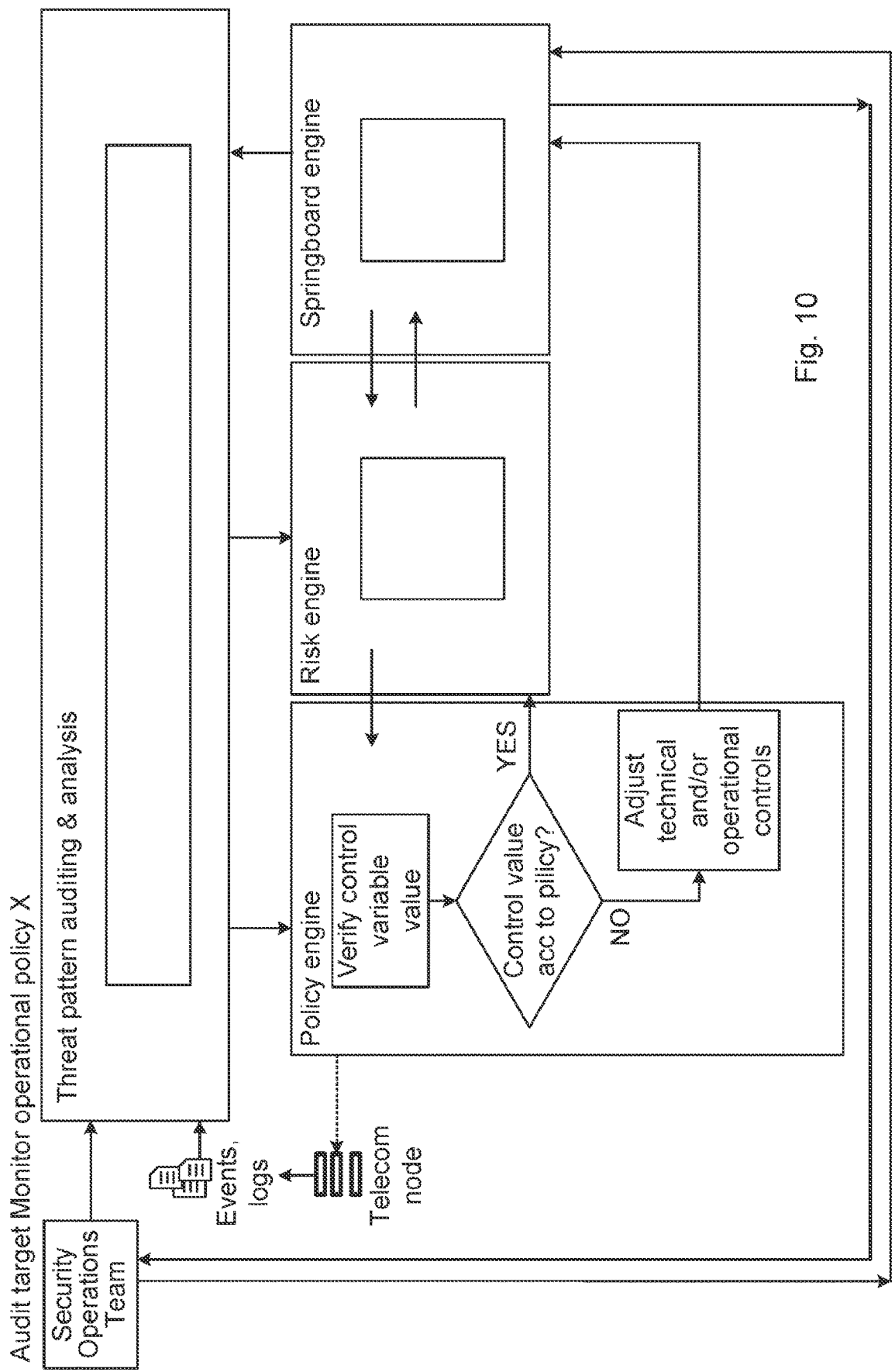
FIG. 10 is a schematic diagram illustrating an example of illustrative operations of a policy engine within an overall context according to a specific embodiment.

Policy Engine:

FIG. 10 is a schematic diagram illustrating an example of illustrative operations of a policy engine within an overall context according to a specific embodiment.

For example, the Policy Engine initiates enforcement, maintains and/or monitors compliance for technical and operational security policies. It receives policy verification and policy modification requests from other components and sends risk notifications for risk evaluation.

For example, the Policy Engine comprises a Policy Catalog with includes policy families, technical security policies, operational security policies, configurable controls for the policies based on industry standard security frameworks. Policy Engine uses policy catalog as a base for selecting, configuring and monitoring applicable security policies and controls for the information technology infrastructure based on the initial risk evaluation.

For example, the Policy Engine configures the initial security profiles of the servers with help of the executable security controls executed on the monitored servers. It adapts or reconfigures policies (modify, add, decommission) automatically for permanent or temporary protection based on the instructions from the Risk Engine received, e.g. via Springboard Engine or more or less directly.

After applying enhanced policy configuration based on Risk Engine instructions, an acknowledgement and residual risk information is sent via Springboard Engine to Risk Engine to execute re-rating for the identified risk in order to confirm the latest risk level of the system.

Springboard Engine—Supporting and/or Coordinating Engine (Optional):

The Springboard Engine, which is also referred to as a Supporting and/or Coordinating Engine, is an optional supporting and/or coordinating function for the Threat Pattern Auditing and Analysis (Threat) Engine, Policy Engine and Risk Engine. It provides support for automating, executing, keeping track and triggering actions from a component to another. It conveys information from another component to another for the purpose of triggering risk evaluation, policy adjustment or initiating further threat monitoring. It is based on machine learning algorithms learning from the past action flows and past risk treatment decisions.

Figure 11:
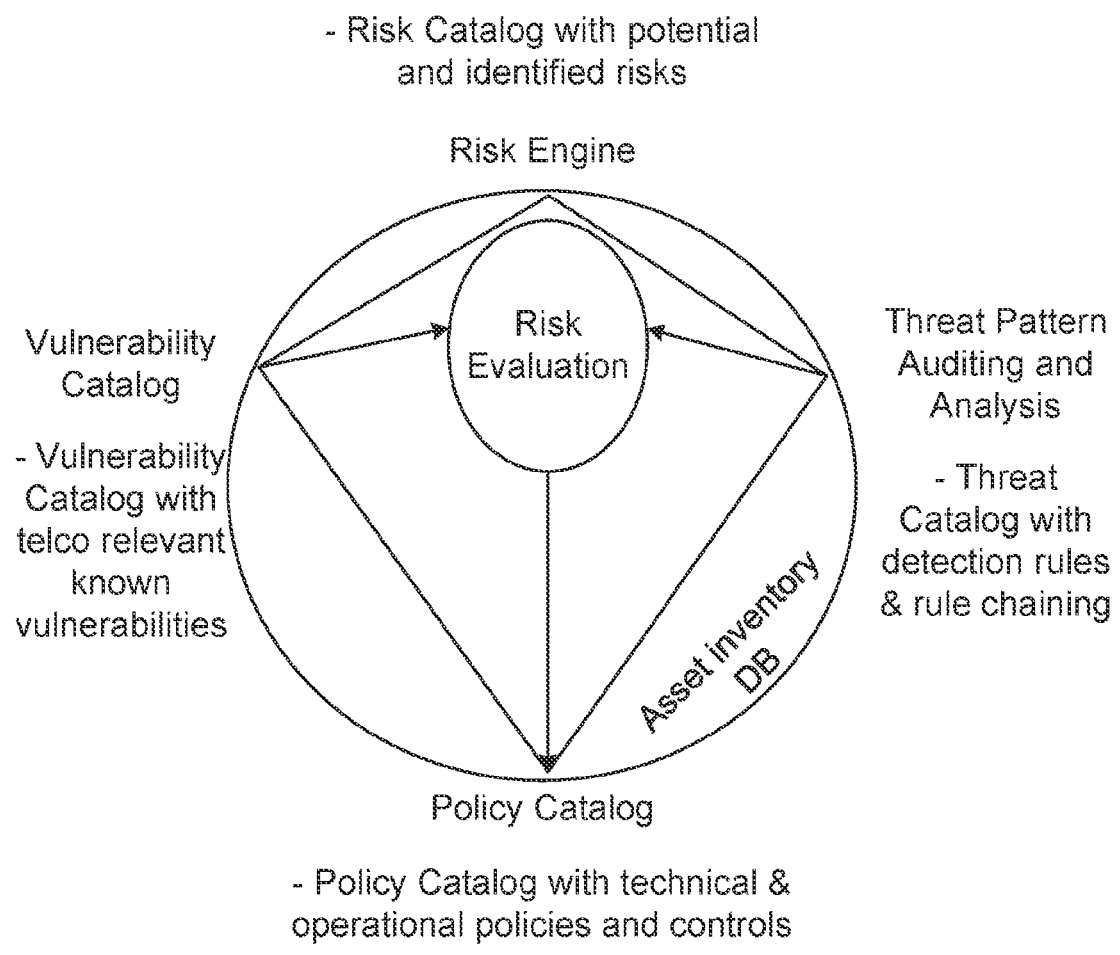
FIG. 11 is a schematic diagram illustrating an example of initialization of a security automation system according to a specific embodiment.

Example of System Initialization:

FIG. 11 is a schematic diagram illustrating an example of initialization of a security automation system according to a specific embodiment, e.g. to define the starting state for risks, vulnerability information, security policies and threat monitoring.

1. Risk Engine initialization may for example be based on a Risk Catalog and a Vulnerability Catalog. Risk Catalog is a collection of potential risks based on industry knowledge such as ENISA Threat Landscape Report, ENISA Threat Landscape for 5G networks, ENISA Cloud Computing Risk Assessment, EU Risk Assessment for 5G, 5G Americas Security Evaluation for 5G and various cybersecurity risk assessment reports. Initial risks are selected from risk catalog based on the identified risk in the risk assessment exercise performed for the information technology system that is managed. Vulnerability Catalog is a collection of generic vulnerability families in an information system based on industry knowledge, risk assessments and database of known software vulnerabilities and indicators of compromise from external sources.

2. Policy Engine initialization may be based on a Policy Catalog. It is a composition of security policy families, technical and operational security policies and controls based on security standard frameworks such as NIST SP800-53r4, ISO27001:2013, ISO27002:2013, ISO27552, NIST Cybersecurity Framework 1.1, CIS Benchmarks and EU GDPR. Initial policies and controls are selected based on the customer security policy requirements. For the given policies respective detection rules are selected based on risk evaluation.

3. Threat Engine initialization may be based on a Threat Catalog. It is a collection of potential known threats (as defined for instance in the above-mentioned risk assessment documents) with detection rules and rules chaining specific for information technology systems. Detection rules to be executed are selected based on the identified risks.

Figure 12:
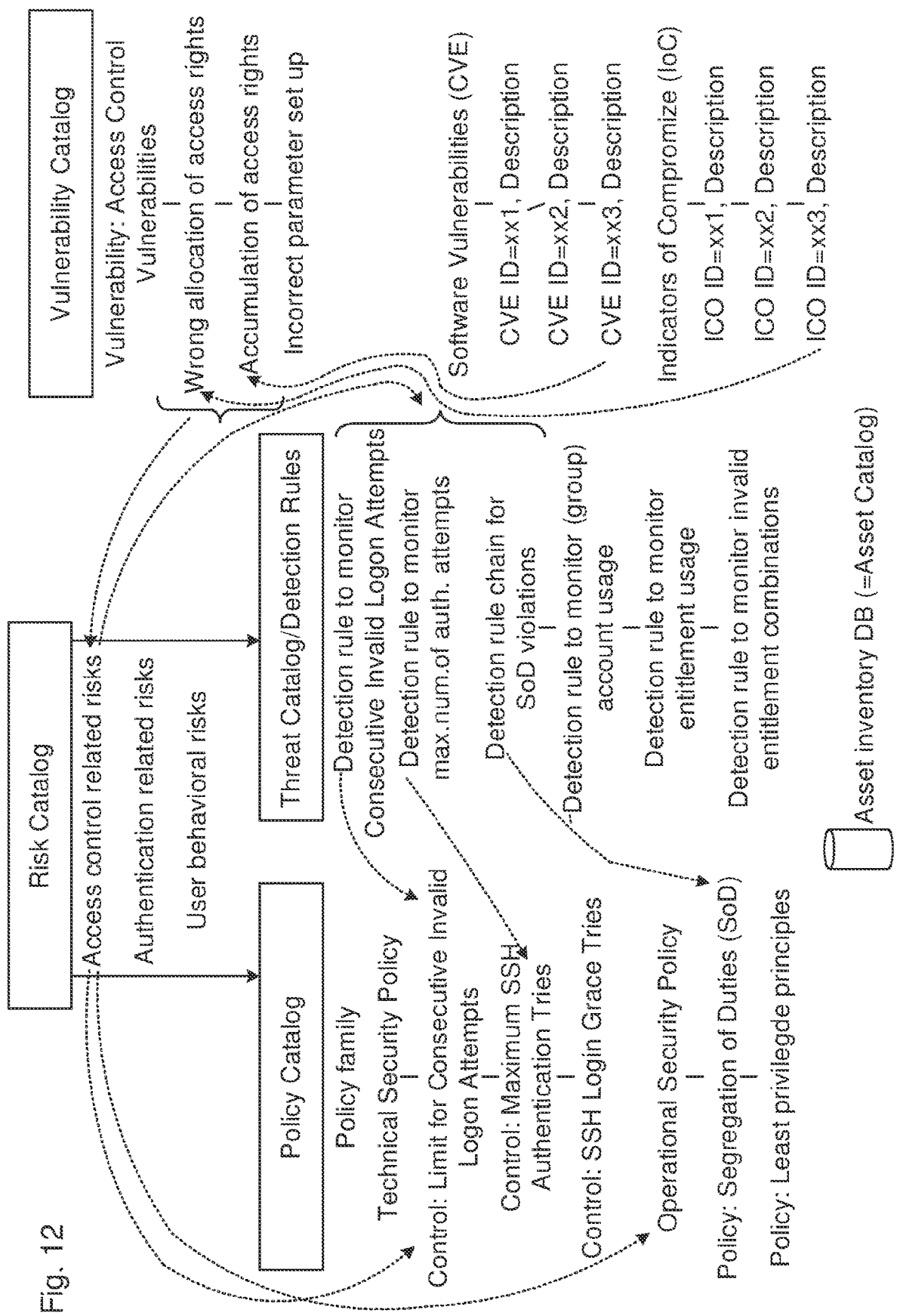
FIG. 12 is a schematic diagram illustrating an example of interaction between risk, vulnerability, policy and threat catalog and asset inventory databases according to a specific embodiment.

FIG. 12 is a schematic diagram illustrating an example of interaction between Risk Catalog, Vulnerability Catalog, Policy Catalog and Threat Catalog relevant for the context which is defined in the Asset Inventory database.

As an example, access control related risks are mitigated with technical and operations security policies (Limit for Consecutive Invalid Logon Attempts, maximum SSH Authentication and Segregation of duties) which are monitored by respective detection rules.

A new software vulnerability (CVE) or Indicator of compromise (IoC) is assigned under the corresponding Vulnerability category (Family) and linked to the matching Risk category. Common Vulnerabilities and Exposures (CVE) generally relates to publicly disclosed information security flaws.

Next steps after Risk, Vulnerability, Policy and Threat Catalog are initialized, may for example be to perform a first iteration of risk evaluation, e.g. with the following steps:

4. Information technology system specific machine learning algorithms are fed into Risk Engine and initial risk evaluation calculation is performed.

5. Based on the risk evaluation results fine tuning for the security policies are performed, risk ratings are updated and initial threat patterns that will be monitored are initiated.

Non-Limiting Examples of Relevant Features:

Examples of relevant features of the security automation system and/or method may involve one or more of the following:

Risk Catalog is maintained, updated and adjusted dynamically during operations of an information technology system to achieve risk-driven security management automation.

Usage and interconnection of Risk Catalog, Vulnerability Catalog, Threat Catalog and Policy Catalog to link together corresponding risks, threats, vulnerabilities and policies.

Usage of machine learning algorithms to utilize the defined and new Risk and Vulnerability catalog information to detect malicious events and security weaknesses on the system under monitoring and to adjust the security policies and detection rules to monitor and mitigate the security risks.

Examples of relevant features in the Risk Engine may involve one or more of the following:

Risk Engine receives notifications on-line related to security policies, vulnerability and threat information.

Risk evaluation is adaptive, highly automated, and near real-time, using automatically updated risk probability calculation.

Risk evaluation calculation is based on several factors e.g. server placement in system topology, detected security events, number and nature of earlier identified risks, historical information and existing, enforced technical and operational security policies and controls, and related vulnerability information.

Risks are calculated not only for individual servers, but also for group of network elements, the whole context and operations.

On-line risk identification and evaluation is continuously performed based on the new threat events collected from an information technology system, based on vulnerability information received and based on risk history.

On-line risk evaluation results are used to dynamically adjust security policies in Policy Catalog for an information technology system.

On-line risk evaluation results are used to trigger further risk monitoring analyzing and collecting threat events and to execute analysis based on historical events.

On-line risk evaluation results are used to dynamically adjust detection rules in Threat Catalog for an information technology system.

Re-rating of identified risks are performed dynamically based on actual evidence collected via risk monitoring.

A new software vulnerability information is categorized to information system level vulnerability families and linked to corresponding risk category to take it into account in the on-line risk evaluation and to adjust detection rules in Threat Catalog.

Automated risk mitigation actions are triggered based on risk evaluation and executed by Policy Engine or Threat Pattern Auditing and Analysis Engine.

Examples of relevant features in the Threat Engine may involve one or more of the following:
- Threat events can be identified based on the information technology specific pre-defined detection rules defined in Threat Catalog.
- Security event information collected from information technology system can be mapped directly to technical security policies, controls, control variables or operational security policies and controls to identify adherence to specified security policies for an information technology system.
- It can directly invoke Risk Engine to execute risk evaluation and risk treatment decision for a new observed threat event.
- It can monitor and analyze threat events on request from Risk Engine and after specified period send additional information to Risk Engine to be used for risk re-rating.
- Detection rules can be adjusted and modified automatically based on the information collected from information technology system.
- Detection rules can be directly associated with technical and operational security policies in Policy Catalog.
- Threat Catalog has direct connection to a Policy Catalog, a Risk Catalog and Vulnerability Catalog.

Examples of relevant features in the Policy Engine may involve one or more of the following:
- Policy Engine is directly connected to Risk Engine, dynamically adjusting security policies according to risk level changes.
- Policy Catalog is dynamically updated and adjusted according to risk evaluation and risk treatment decisions Examples of Use Cases:

In the non-limiting examples below, the so-called springboard engine may be optional and the considered functions, steps and/or actions thereof may at least partly be integrated in the Threat Engine, Risk Engine and/or Policy Engine. In some regards, the springboard engine may be at least partly transparent, just forwarding the relevant information and/or trigger to the relevant engine, depending on the situation and the circumstances.

Also, optional or less important steps and/or actions are not highlighted in the non-limiting examples below.

Figure 13:
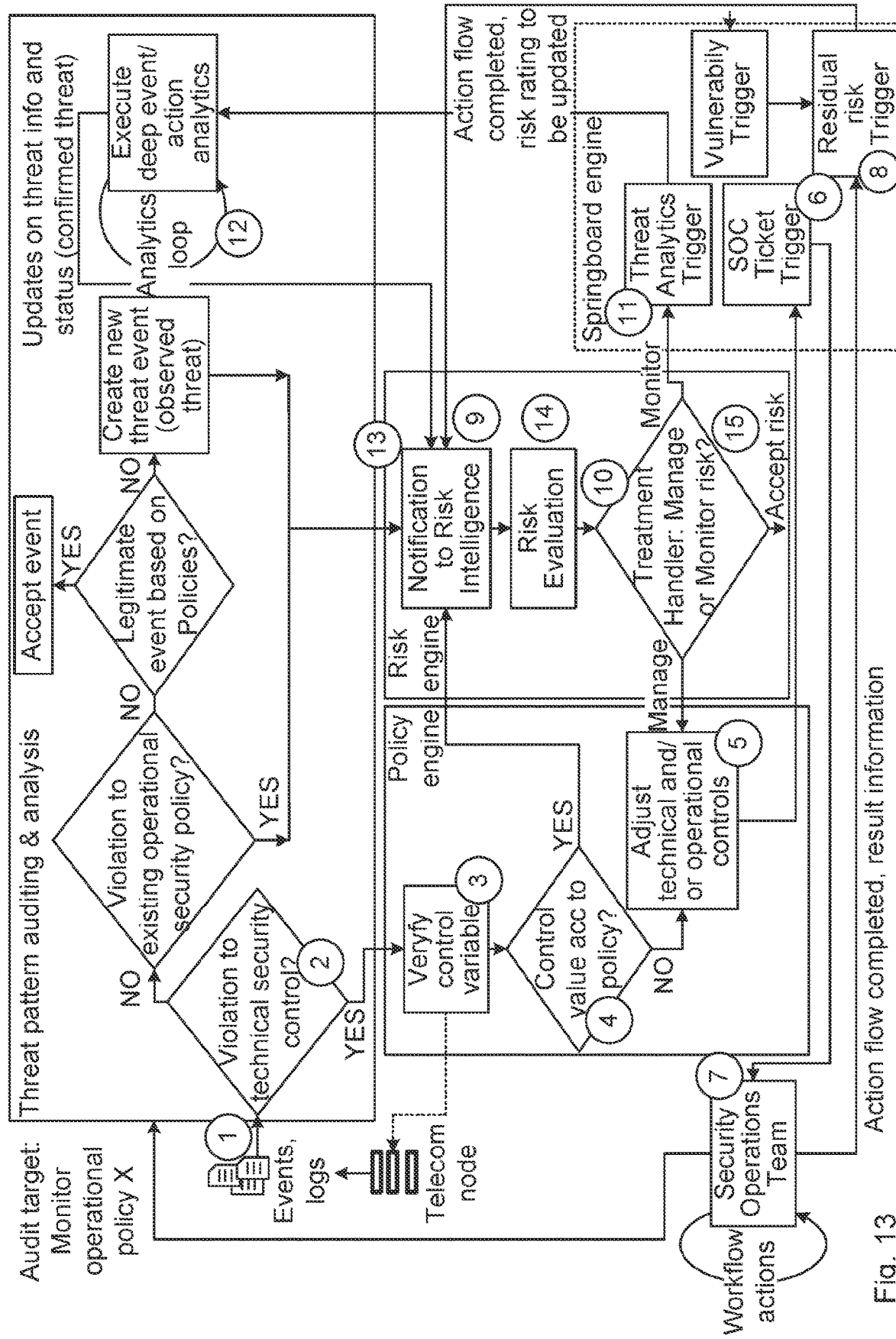
FIG. 13 is a schematic diagram illustrating a use case example according to an embodiment.

Use Case 1: Security event directly related to a technical security policy and control FIG. 13 is a schematic diagram illustrating a use case example according to an embodiment.

Starting point: Risk identified as "Unauthorized user access", technical security policy enforced with control "maximum allowed failed logins=4" to mitigate the risk, detection rule for "failed invalid login attempts" activated and log collection on-going. Risk Catalog, Vulnerability Catalog, Threat Catalog and Policy Catalog initialized and up-to-date.

1. Threat Pattern Auditing and Analysis received a log file from a server.
2. Detection rule detects the log file contains several of failed invalid logon attempts from the same user. Threat Pattern Auditing & Analysis invokes the policy engine to verify the infraction of the technical security policy.
3. Policy engine reads the Restrict Invalid Logon Attempt control values from the server where the log files were received.
4. The received control values from the server are compared to the Policy catalog defined values. Comparison indicates that control value for Maximum allowed failed login attempts is not according to the defined Security policy (deviates from the set value of 4).
5. Policy Engine adjusts automatically the control variable value to be compliance with the Security Policy
6. SOC ticket trigger is invoked following the change control procedure to notify SOC operation team to approve the control value adjustment, one or more security actions may be triggered.
7. SOC team accept the changes and result and residual risk information is forwarded to Springboard engine.
8. Springboard engine triggers additional notification to risk intelligence.
9. Risk Engine runs through risk evaluation mapping the risk notification to identified "Unauthorized user access" risk, reads the current risk level and compares the new event to the historical behavioral baseline using machine learning and takes residual risk information as input. As a result of risk evaluation, new risk level is calculated, compared with previous risk level and acceptable risk levels.
10. As a result of step 9 risk evaluation calculation, Risk Treatment Handler concludes that acceptable risk level is not reached, and risk and/or threat will be monitored and/or managed.
11. Optionally, Threat Analytics Trigger is invoked by Risk Engine via Springboard Engine to notify Threat Pattern Auditing & Analysis to monitor the threat and/or risk.
12. Threat Pattern Auditing & Analysis starts to run continuous monitoring loop to identify similar behavior during the specified period. Results are sent to Risk Engine.
13. Risk Engine receives notification and results from deep analysis from Threat Pattern Auditing & Analysis.
14. Risk Engine revises previous risk evaluation based on the deep analysis update. New risk level is calculated, compared with the initial risk level and acceptable risk levels.
15. As a result of step 14 risk evaluation calculation, Risk Treatment Handler decides to accept the risk.

Figure 14:
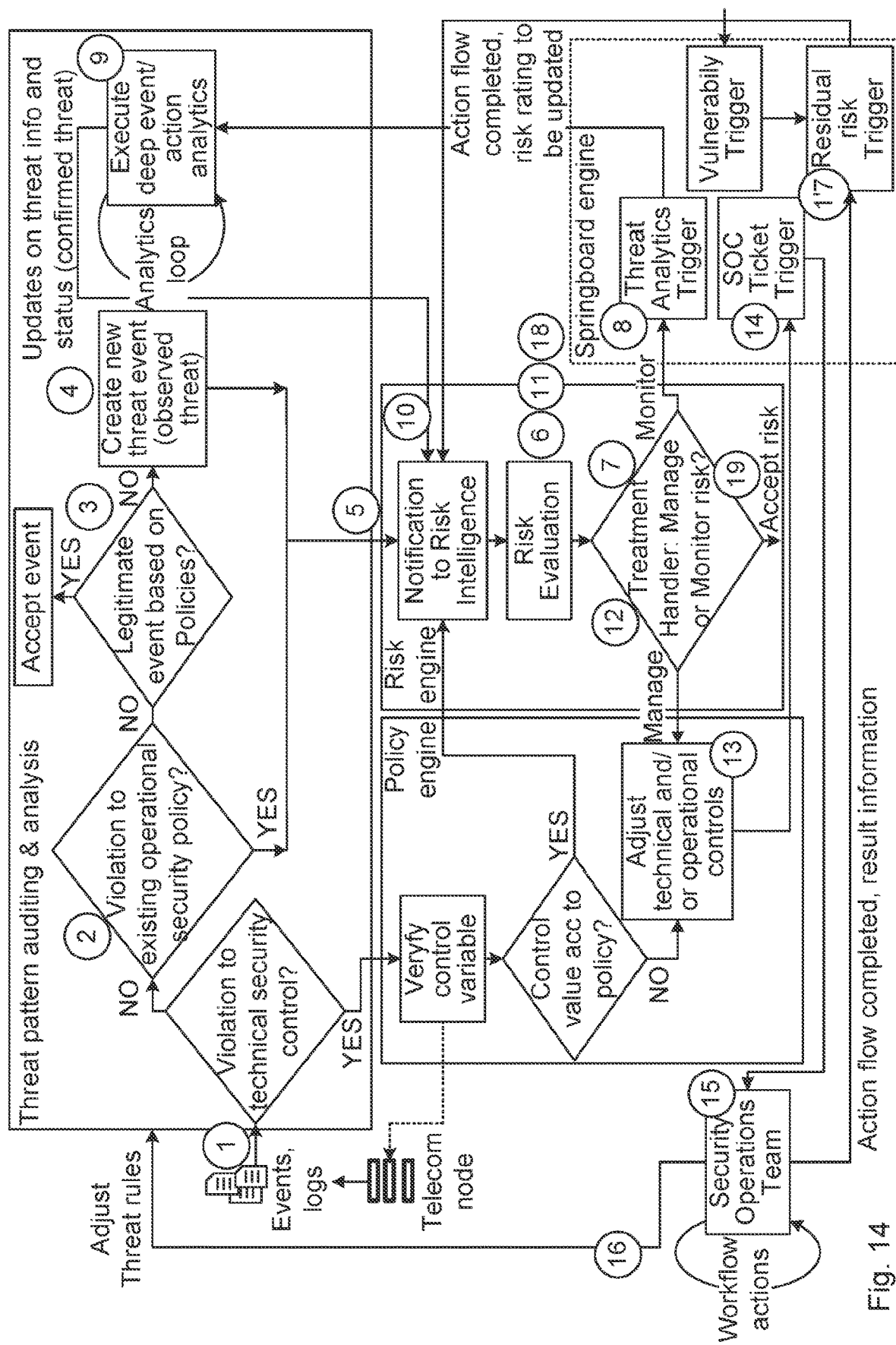
FIG. 14 is a schematic diagram illustrating a use case example according to another embodiment.

Use case 2: New operational risk, risk put into monitoring mode followed by risk treatment decision and action FIG. 14 is a schematic diagram illustrating a use case example according to another embodiment.

Starting point: Technical and operational security policies enforced, Risk Catalog, Vulnerability Catalog and Threat Catalog up-to-date. Detection rules enabled and log collection on-going.

1. Threat Pattern Auditing & Analysis receives log files and security events from a server.
2. Detection rule notices the log file contains several unspecified actions. Threat Pattern Auditing & Analysis reasons it is not in violation to existing technical security policies.
3. Threat Pattern Auditing & Analysis reasons it is not in violation to existing operational security policies.
4. Threat Pattern Auditing & Analysis reasons it is not legitimate event related to policies.
5. Threat Pattern Auditing & Analysis creates a new observed threat event and sends it to Risk Engine for further evaluation.
6. Risk Engine receives the risk notification regarding the new observed threat event. It runs through risk evaluation identifying this as a new risk. It compares the new event to the historical behavioral baseline using machine learning and as a result, calculates an initial risk level.
7. Risk Engine Risk Treatment Handler compares the initial risk level for the new identified risk with acceptable risk levels. Risk Treatment Handler decides to put the risk into monitor mode.

8. Threat Analytics Trigger is invoked by Risk Engine to notify Threat Pattern Auditing & Analysis to execute detailed event analysis.
9. Threat Pattern Auditing & Analysis runs further machine learning based analysis using historical information. It also starts to run continuous monitoring loop to identify similar behavior during the specified period. Results are sent to Risk Engine.
10. Risk Engine receives notification and results from deep analysis from Threat Pattern Auditing & Analysis.
11. Risk Engine revises previous risk evaluation based on the deep analysis update. New risk event is added to the risk catalog, new risk level is calculated, compared with the initial risk level and acceptable risk levels.
12. As a result of step 11 risk evaluation calculation, Risk Treatment Handler decides to manage the risk by introducing new security policies and controls. Risk Treatment Handler notifies Policy Engine about the needed for policy adjustment by creating a new Policy and control to policy catalog.
13. Policy Engine creates a new policy, control and control value to the policy catalog.
14. SOC ticket trigger is invoked following the change control procedure to notify SOC operation team to approve the control value adjustment
15. SOC team analyses the policy catalog update and accept the changes.
16. As a result of analysis, a new detection rule is created and imported to the Threat catalog.
17. Springboard engine receives SOC team information and Springboard engine triggers additional notification to risk intelligence.
18. Risk Engine runs through risk evaluation mapping the risk notification the new risk event, reads the current risk level and compares the new event to the historical behavioral baseline using machine learning. As a result of risk evaluation, new risk level is calculated, compared with previous risk level and acceptable risk levels.
19. Risk Engine revises previous risk evaluation based on the deep analysis update. New risk level is calculated, compared with the initial risk level and acceptable risk levels. Risk Treatment Handler decides to accept the risk.

Use Case 3: New software (CVE) vulnerability received, based on the risk evaluation, Risk Catalog updated, and a new detection rule deployed in Threat Catalog Starting point: Technical and operational security policies enforced, Risk Catalog, Vulnerability Catalog and Threat Catalog up-to-date. Detection rules enabled and log collection on-going.

Figure 15:
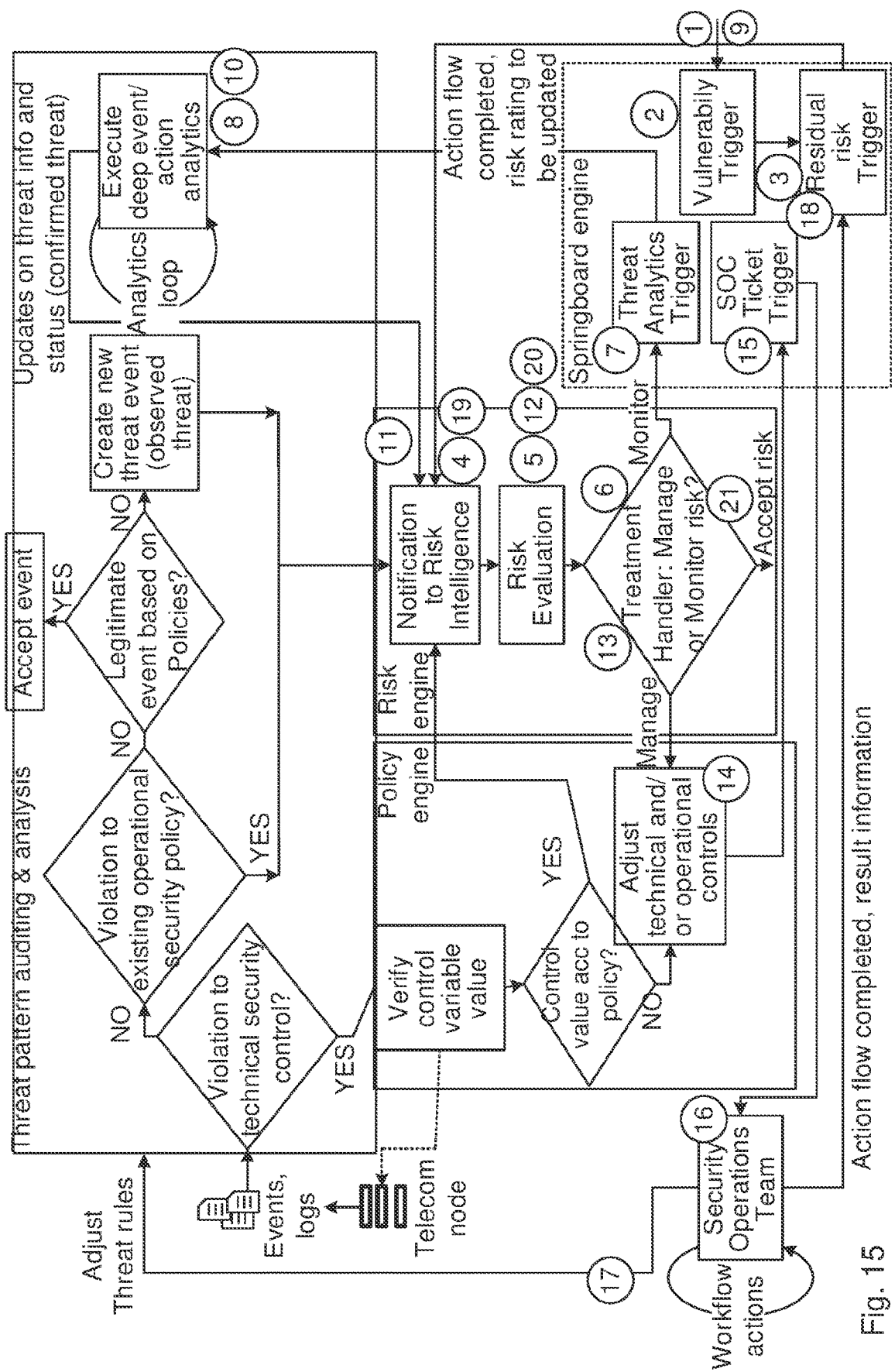
FIG. 15 is a schematic diagram illustrating a use case example according to yet another embodiment.

FIG. 15 is a schematic diagram illustrating a use case example according to yet another embodiment.
1. A new software vulnerability (CVE) is received from an external source.
2. Using machine learning algorithms springboard engine analyses the CVE and updates Vulnerability Catalog about the new vulnerability since the CVE is valid for the information technology system under monitoring.
3. Springboard engine triggers a notification to risk intelligence
4. Risk Engine receives notification regarding the new observed vulnerability event from the Springboard engine
5. Risk Engine executes risk evaluation identifying this as a new risk. It compares the new event to the historical behavioral baseline using machine learning and as a result, calculates an initial risk level.
6. Risk Engine Risk Treatment Handler compares the initial risk level for the new identified risk with acceptable risk levels. Risk Treatment Handler decides to put the risk into monitor mode.
7. Threat Analytics Trigger is invoked by Risk Engine to notify Threat Pattern Auditing and Analysis to execute detailed event analysis and monitor for events which may be related to the new identified risk. Threats may be detected.
8. Threat Pattern Auditing & Analysis runs further machine learning based analysis using historical information. It also starts to run continuous monitoring loop to identify behavior which is matching with the risk during the specified period.
9. A new Indication of compromise (IoC) is received from an external source. This IoC is related to same vulnerability as earlier received as software vulnerability in step 1.
10. Steps 2-8 are repeated for IoC. Threat Pattern Auditing & Analysis detects similar threat behavior as detected in the step 8. Results are sent to Risk Engine.
11. Risk Engine receives notification and results from deep analysis from Threat Pattern Auditing & Analysis.
12. Risk Engine revises previous risk evaluation based on the deep analysis update (repeatable new threat event). A new risk level is calculated, compared with the initial risk level and acceptable risk levels.
13. As a result of step 12 risk evaluation calculation, Risk Treatment Handler decides to create a new risk to the Risk Catalog and manage the new risk by introducing new security policies and controls. Risk Treatment Handler notifies Policy Engine about the needed for policy adjustment by creating a new Policy and control to policy catalog.
14. Policy Engine creates a new policy, control and control value to the policy catalog.
15. SOC ticket trigger is invoked following the change control procedure to notify SOC operation team to approve the control value adjustment
16. SOC team analyses the suggested Policy Catalog updates and accepts the changes. Policy Engine enforces the new policies.
17. As a result of analysis, a new detection rule is created and imported to the Threat catalog. Threat monitoring is automatically started according to the new detection rule.
18. After SOC team has accepted the changes, residual risk information is sent via Springboard Engine to Risk Engine.
19. Risk Engine receives notification from the Springboard engine
20. Risk Engine revises previous risk evaluation based on the residual risk information. New risk level is calculated, compared with the initial risk level and acceptable risk levels.
21. As a result of step 20 risk evaluation calculation, risk is accepted by the Risk Treatment Handler.

End status: Vulnerability Catalog has been updated with the new vulnerability and IoC information, Risk Catalog has been updated with new risk, Policy Catalog has been updated with new policies. Policy Engine enforced the new policies to information technology system, Threat Catalog has been updated with new detection rule and monitoring according to the new detection rule has been started.

Examples of particular technical effects and/or advantages may include one or more of the following:
- Ability to directly correlate collected security events with security policies and technical controls.
- Ability to automatically monitor, based on the events collected from servers, whether operational and technical security policies are adhered to.
- Ability to dynamically correlate collected security events to security risks.

Ability to monitor identified security risks and map and correlate threat analytics results with previously detected security risks and events.

Ability to execute on-line risk evaluation based on the security event information.

Ability to make automated risk treatment decision to adjust operational and technical security controls.

Ability to make automated risk treatment decision to remove security controls that are no more required based on risk evaluation.

Ability to make automated risk treatment decision to monitor further the situation.

Ability to re-rate the risk evaluation based on residual risk information received.

Ability to automatically combine individual pieces of information from threat pattern auditing and analysis, risk management, vulnerability information, security policy management and risk mitigation results in order to adjust security policies and controls.

Ability to use machine learning for automating correlation and combination of individual pieces of information from risk, vulnerability, threat and security policy perspective.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units. The terms "processing circuitry" and "processor" may be used interchangeably in parts of this disclosure.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 16A:
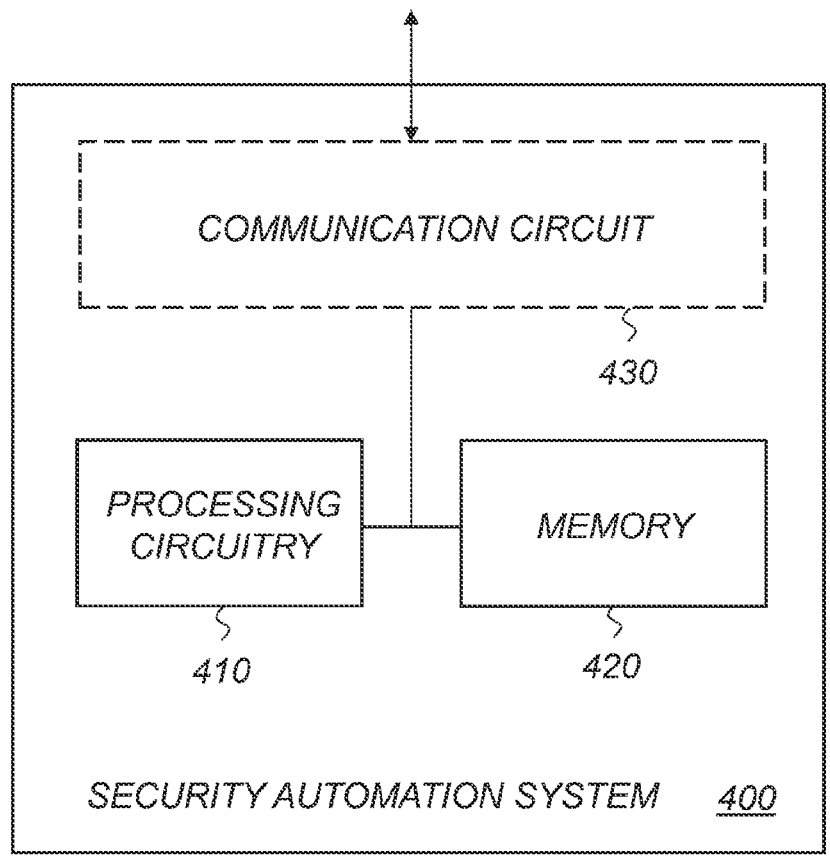
FIG. 16A is a schematic block diagram illustrating an example of a security automation system according to an embodiment.

FIG. 16A is a schematic block diagram illustrating an example of a security automation system according to an embodiment.

In this particular example, the security automation system 400 comprises processing circuitry 410 including one or more processors and a memory 420, the memory 420 comprising instructions executable by the processing circuitry 410, whereby the security automation system 400 is operative to perform security management of the Information Technology system.

In other words, the processing circuitry is operative to perform at least some of the steps, actions and/or functions described herein, including the operations of the security automation system 400.

Optionally, the security automation system 400 may also include a communication circuit 430. The communication circuit 430 may include functions for wired and/or wireless communication with other devices and/or network nodes in the network. In a particular example, the communication circuit 430 may be based on radio circuitry for communication with one or more other nodes, including transmitting and/or receiving information. The communication circuit 430 may be interconnected to the processing circuitry 410 and/or memory 420. By way of example, the communication circuit 430 may include any of the following: a receiver, a transmitter, a transceiver, input/output (I/O) circuitry, input port(s) and/or output port(s).

Figure 16B:
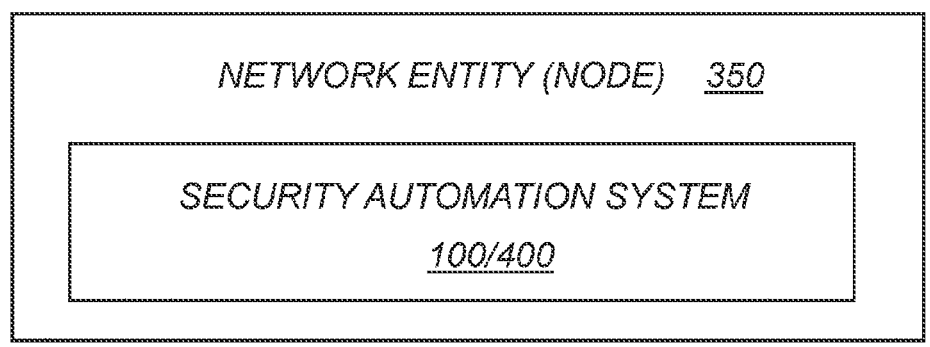
FIG. 16B is a schematic block diagram illustrating an example of a network entity (node) comprising a security automation system according to an embodiment.

FIG. 16B is a schematic block diagram illustrating an example of a network entity (node) comprising a security automation system according to an embodiment.

For example, the network entity 350 may be a network node or part thereof and/or a cloud-based network device.

Figure 17:
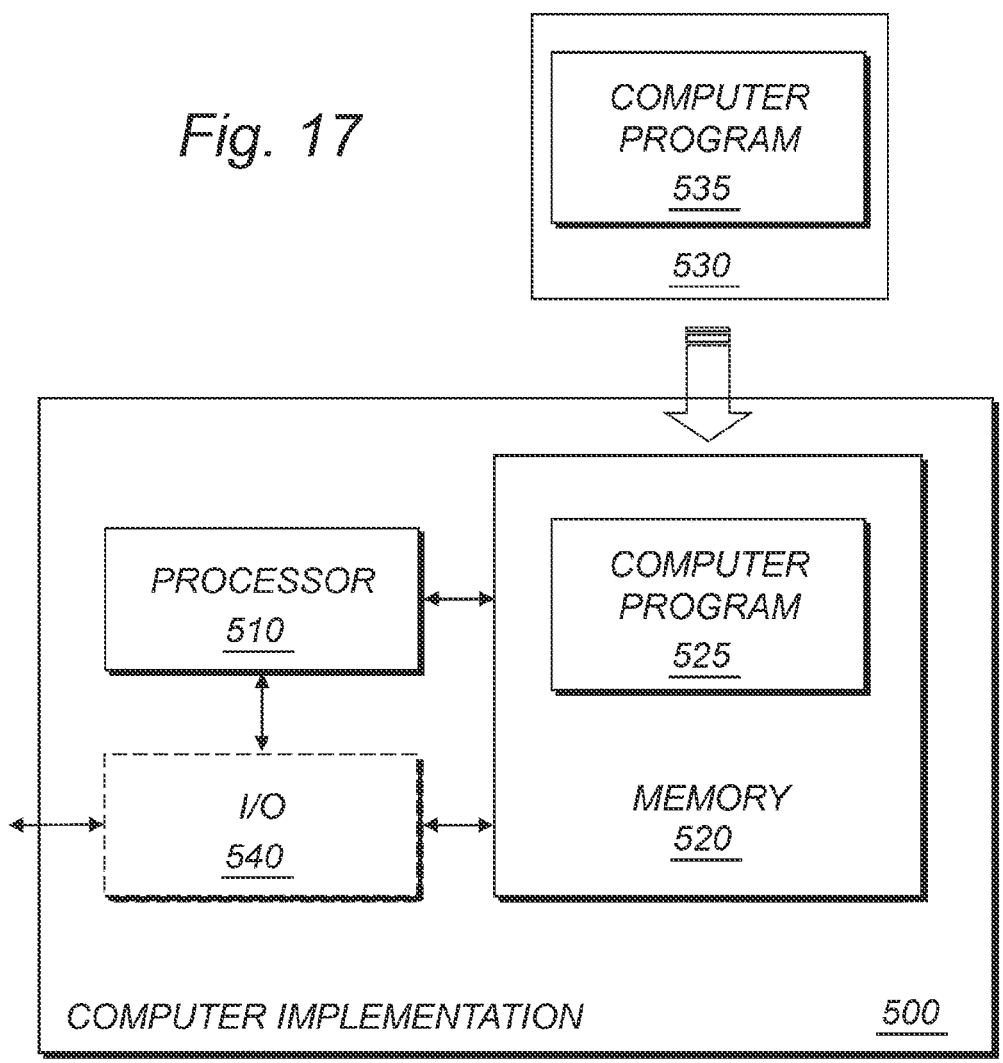
FIG. 17 is a schematic diagram illustrating an example of a computer-implementation according to an embodiment.

FIG. 17 is a schematic diagram illustrating an example of a computer-implementation according to an embodiment. In this particular example, at least some of the steps, functions, procedures, modules and/or blocks described herein are implemented in a computer program 525; 535, which is loaded into the memory 520 for execution by processing circuitry including one or more processors 510. The processor(s) 510 and memory 520 are interconnected to each other to enable normal software execution. An optional input/output device 540 may also be interconnected to the processor(s) 510 and/or the memory 520 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 510 is thus configured to perform, when executing the computer program 525, well-defined processing tasks such as those described herein.

The processing circuitry does not have to be dedicated to only execute the above-described steps, functions, procedure and/or blocks, but may also execute other tasks.

In a particular embodiment, there is provided a computer program 525; 535 for performing, when executed, security management of an Information Technology system. The computer program 525; 535 comprises instructions, which when executed by at least one processor 510, cause the at least one processor 510 to perform the security management described herein.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 525; 535 may be realized as a computer program product, which is normally carried or stored on a computer-readable medium 520; 530, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Alternatively, it is possible to realize such module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is also becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general-purpose network device, or a hybrid thereof.

A special-purpose network device may use custom processing circuits and a proprietary operating system (OS), for execution of software to provide one or more of the features or functions disclosed herein.

A general-purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general-purpose network device may for example include hardware comprising a set of one or more processor(s), often COTS processors, and network interface controller(s) (NICs), as well as non-transitory machine-readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high-volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A security automation system configured for security management of an information technology (IT) system, the security automation system comprising:
   a data storage system comprising one or more memories, wherein the data storage system stores:
      a threat catalog with detection rules;
      a vulnerability catalog comprising a database storing generic and known vulnerabilities of the IT system;
      a risk catalog comprising a database storing potential risks and identified risks for the IT system; and
      a policy catalog with security policies; and
   processing circuitry, wherein the security automation system is configured to perform a method comprising:
      identifying threat events;
      using a machine learning algorithm for collecting information in the risk catalog and in the vulnerability catalog, in order to detect malicious events and security weaknesses in the IT system;
      adapting one or more security policies from the policy catalog based on a risk evaluation, wherein the adapting comprises adjusting the one or more security policies in order to mitigate security risks; and
      adjusting one or more of the detection rules based on information collected from the IT system.

2. The security automation system of claim 1, wherein the security automation system is adapted to use results from on-line risk evaluation for dynamically adjusting the detection rules of the threat catalog.

3. The security automation system of claim 1, wherein the security automation system is adapted to further monitor and analyze identified threat events, and after a specified period sending information for risk evaluation and risk rating.

4. The security automation system of claim 1, wherein the risk catalog is updated dynamically during operations of the IT system for achieving a risk-driven and automatic security management.

5. The security automation system of claim 3, wherein the identified risks in the risk catalog are re-rated dynamically.

6. The security automation system of claim 1, wherein the security policies of the policy catalog are associated with the detection rules of the threat catalog.

7. The security automation system of claim 1, wherein the risk catalog, the vulnerability catalog, the threat catalog, and the policy catalog are interconnected.

8. The security automation system of claim 1, wherein the security automation system is adapted for analyzing threat events based on IT specific pre-defined detection rules in the threat catalog.

9. The security automation system of claim 1, wherein the IT system comprises interacting components, wherein each component is associated with at least one operational asset, and wherein each operational asset is organized in at least one security domain according to a system topology.

10. The security automation system of claim 1, wherein the security automation system further comprises processing circuitry and memory, the memory comprising instructions executable by the processing circuitry, whereby the security automation system is operative to perform security management of the IT system.

11. A network entity of a communication system or network comprising a security automation system configured for security management of an information technology (IT) system, the security automation system comprising:

a data storage system comprising one or more memories, wherein the data storage system stores:
  a threat catalog with detection rules;
  a vulnerability catalog comprising a database storing generic and known vulnerabilities of the IT system;
  a risk catalog comprising a database storing potential risks and identified risks for the IT system; and
  a policy catalog with security policies; and
processing circuitry, wherein the security automation system is configured to perform a method comprising:
  identifying threat events;
  using a machine learning algorithm for collecting information in the risk catalog and in the vulnerability catalog, in order to detect malicious events and security weaknesses in the IT system;
  adapting one or more security policies from the policy catalog based on a risk evaluation, wherein the adapting comprises adjusting the one or more security policies in order to mitigate security risks; and
  adjusting one or more of the detection rules based on information collected from the IT system.

12. The network entity of claim 11, wherein the network entity is a network node or a cloud-based network device.

13. A method for security management of an information technology (IT) system having a number of interacting system components, each system component being associated with one or more operational assets relevant to the operation of the system component, wherein the operational assets are organized in one or more security domains according to a system topology, whereby the security automation system of claim 1 is operative to perform security management of the IT system.

* * * * *